(12) United States Patent
Bingleman et al.

(10) Patent No.: US 10,488,737 B2
(45) Date of Patent: Nov. 26, 2019

(54) DOME CAMERA

(71) Applicant: Avigilon Corporation, Vancouver (CA)

(72) Inventors: Luke William Bingleman, Vancouver (CA); Sudeep Mohan, Surrey (CA); Christopher James Cullington Okrainetz, Vancouver (CA); Sergio Parise, Vancouver (CA); Nigel Geoffrey Taylor, Maple Ridge (CA)

(73) Assignee: Avigilon Corporation, Vancouver (CA)

( * ) Notice: Subject to any disclaimer, the term of this patent is extended or adjusted under 35 U.S.C. 154(b) by 0 days.

(21) Appl. No.: 15/380,299

(22) Filed: Dec. 15, 2016

(65) Prior Publication Data

US 2017/0205686 A1 Jul. 20, 2017

Related U.S. Application Data

(60) Provisional application No. 62/278,855, filed on Jan. 14, 2016.

(51) Int. Cl.
*G08B 13/196* (2006.01)
*G03B 17/55* (2006.01)
(Continued)

(52) U.S. Cl.
CPC ............ *G03B 17/55* (2013.01); *G02B 7/028* (2013.01); *G03B 17/08* (2013.01); *G03B 17/561* (2013.01)

(58) Field of Classification Search
CPC .......... G03B 17/55; G03B 5/00; G03B 17/12; G03B 17/561; G03B 14/00; G02B 7/023;
(Continued)

(56) References Cited

U.S. PATENT DOCUMENTS 6,061,087 A 5/2000 Schieltz et al.
7,387,453 B2 6/2008 Arbuckle
(Continued)

FOREIGN PATENT DOCUMENTS

CN 204156956 U 2/2015
KR 2009-0084383 8/2009

OTHER PUBLICATIONS

"IQeye Alliance-pro Series Vandal-resistant IP Camera"; Manual; Jun. 2014; 20 pages.
(Continued)

*Primary Examiner* — Clayton E. LaBalle
*Assistant Examiner* — Fang-Chi Chang
(74) *Attorney, Agent, or Firm* — Daniel Hammond

(57) ABSTRACT

A camera device has a dome bubble member and an imaging unit housed within the camera chamber. A heat-emitting element, such as a film, may be arranged about the lens unit and is adapted to radiate heat for heating the dome bubble member. The camera device may include a sealing member adapted to sealingly engage a portion of the dome bubble member, whereby the heat radiated from the heat-emitting element is substantially contained within the sealed subchamber. The imaging unit may be rotatable about a first axis and a second axis in which the second axis is offset from the center of the dome bubble member and is displaceable in at least one direction transverse to itself. The camera device may have a shroud member that is pivotal about a third axis. The camera device may also have a shroud member that is transmissive to infra-red light.

6 Claims, 23 Drawing Sheets

(51) Int. Cl.
*G03B 17/56* (2006.01)
*G02B 7/02* (2006.01)
*G03B 17/08* (2006.01)

(58) Field of Classification Search
CPC ............... G02B 7/028; G08B 13/1963; G08B 13/19619; G08B 13/19632; G08B 13/19617; F16M 11/18
USPC .......................................... 396/427; 348/143
See application file for complete search history.

(56) References Cited

U.S. PATENT DOCUMENTS

| | | |
|---|---|---|
| 8,964,042 B2 | 2/2015 | Nozawa et al. |
| 2007/0109441 A1 | 5/2007 | Cheng |
| 2007/0183772 A1 | 8/2007 | Baldwin et al. |
| 2011/0096164 A1* | 4/2011 | Mori ................... G02B 7/003 348/143 |
| 2012/0170119 A1 | 7/2012 | Chu et al. |
| 2013/0093948 A1* | 4/2013 | Takeshita ............ H04N 5/2253 348/374 |
| 2014/0348498 A1* | 11/2014 | Aiba ...................... G03B 13/32 396/20 |
| 2015/0381858 A1* | 12/2015 | Sterngren ............. F16H 57/12 348/143 |
| 2016/0255251 A1* | 9/2016 | Urano ................. H04N 5/2252 348/143 |

OTHER PUBLICATIONS

"IQeye Alliance™ Series"; Pro Line fact sheet; 2 pages. Mar. 26, 2009.

* cited by examiner

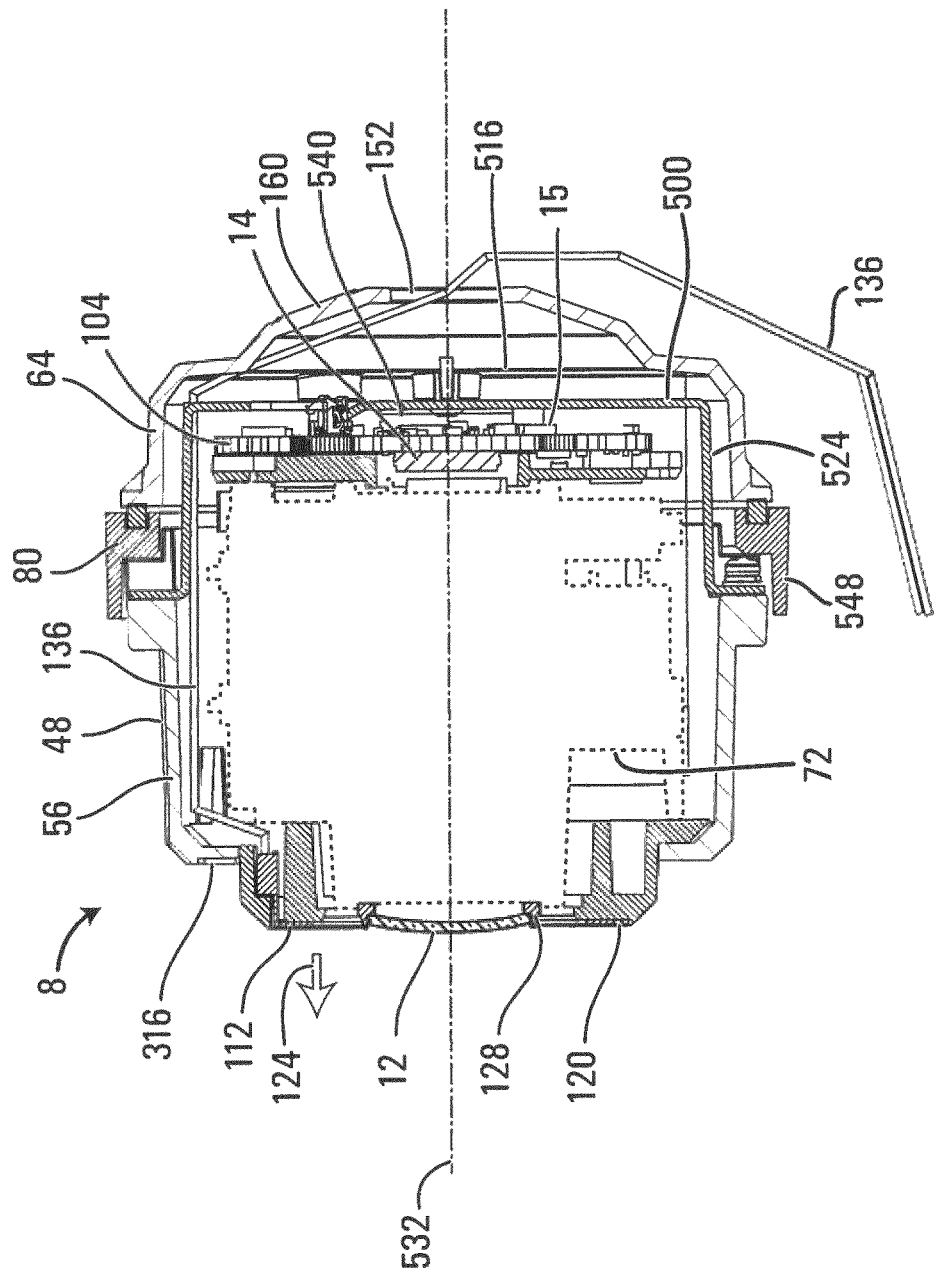

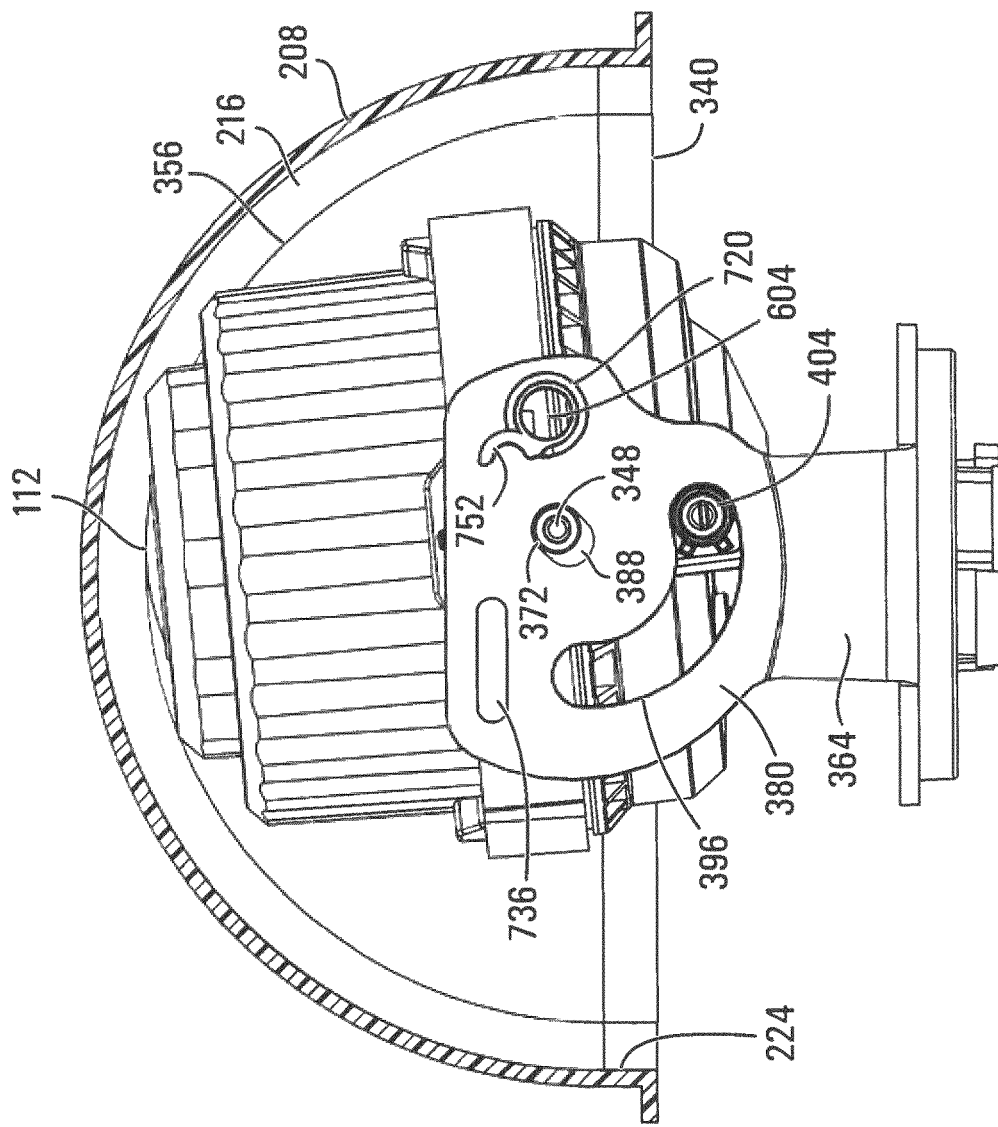

DOME CAMERA

RELATED U.S. APPLICATION DATA

The present application claims the benefit of provisional application No. 62/278,855 filed on Jan. 14, 2016, the entire contents of which are hereby incorporated by reference.

BACKGROUND

Dome cameras are widely used in various applications for capturing images of a scene. Use in surveillance is one particular application. The dome of the camera may protect components of the camera from outside particles and liquids. Furthermore, the dome can assist in concealing the orientation of lens of the camera. An example impact of the concealment is reducing the feeling of intrusion that may be experienced by people located near the camera.

To ensure good performance of the dome camera, the dome of the camera should be kept clear of any elements that may obstruct light reaching the lens of the camera.

The image capturing unit of the dome camera is housed within the dome of the camera. This introduces some space restrictions that may not be present in other forms of cameras.

SUMMARY

The embodiments described herein provide in one aspect a camera device that includes a dome bubble member partly defining a camera chamber, an imaging unit having a lens unit and being housed within the camera chamber and a heat-emitting film arranged about the lens unit and being adapted to radiate heat for heating the dome bubble member.

The embodiments described herein provide another aspect a camera device that includes a dome bubble member partly defining a camera chamber, an imaging unit having a lens unit and being housed within the camera chamber, a sealing member adapted to sealingly engage a portion of the dome bubble member and the imaging unit, thereby defining a sealed sub-chamber containing the lens unit, and a heat-emitting element housed within the sealed sub-chamber, the heat radiated from the heat-emitting element being substantially contained within the sealed sub-chamber.

The embodiments described herein provide in yet another aspect a camera device that includes a dome bubble member partly defining a camera chamber, an imaging unit being housed within the camera chamber and being rotatable about a first axis and a second axis, the second axis being offset from a center of the dome bubble member and being displaceable in at least one direction transverse to itself.

The embodiments described herein provide in yet another aspect a camera device that includes a base member, a dome bubble member defining with the base member a camera chamber, an imaging unit housed within the camera chamber, and a support member, the imaging unit being pivotally and displaceably coupled to the support member, the supporting member being rotatable about the base member to define a first axis of rotation of the imaging assembly and a combination of the pivoting and displacement about the support member causing a front end of the imaging unit to be displaced within a displacement path that is concentric with the dome bubble member.

The embodiments described herein provide in yet another aspect a camera device that includes a dome bubble member, a base member being cooperatively coupled to the dome bubble member to define a camera chamber, and a movable part being housed within the camera chamber and being rotatable relative to the base member about a first axis, the movable part having an imaging unit being rotatable about a second axis and a shroud member being pivotal about a third axis.

The embodiments described herein provide in yet another aspect a camera device that includes a dome bubble member partly defining a camera chamber, an imaging unit being housed within the camera chamber, and a shroud member being housed within the camera chamber and being formed of an infra-red transmissive material.

The embodiments described herein provide in yet another aspect a camera device that includes a substantially cylindrical body defining an internal chamber, at least a portion of an annular sidewall of the cylindrical body being formed of a thermally conductive material, an image sensor being housed within the internal chamber and a thermally conductive spreader member being housed within the internal chamber, a first portion of the spreader member being in thermal contact with the image sensor and a second portion of the spreader member being in thermal contact with the thermally conductive portion of the annular sidewall of the cylindrical body.

According to some example embodiments, the heat-emitting film is arranged circumferentially about the lens unit.

According to some example embodiments, the heat-emitting film is chosen from a laminated heating film, silicon heating film, polyimide heating film, polyester heating film and carbon film.

According to some example embodiments, the heat-emitting film is spaced apart from the dome bubble member to form a gap therebetween and wherein heat is radiated to the dome bubble member across the gap.

According to some example embodiments, the gap has a height of at most about 15 mm.

According to some example embodiments, a heat-emitting surface of the heat-emitting film is exposed.

According to some example embodiments, the imaging unit comprises a front face having an annular bezel, the lens unit is located on the front face, the annular bezel surrounding the lens unit, and the heat-emitting film is disposed on the annular bezel.

According to some example embodiments, the heat-emitting film is secured to the annular bezel using an adhesive.

According to some example embodiments, the imaging unit further comprises an annular sealing member adapted to sealingly engage a portion of the inner surface of the dome bubble member to define a sealed sub-chamber and the heat radiated from the heat-emitting conductive film is substantially contained within the sealed sub-chamber.

According to some example embodiments, the annular sealing member extends forwardly of the imaging unit.

According to some example embodiments, the annular sealing member is flexible.

According to some example embodiments, the heat radiated from the heat-emitting film heats an area of the dome bubble member substantially corresponding to an orientation of the imaging unit relative to dome bubble member.

According to some example embodiments, the imaging unit is rotatable about two axes to change an orientation of the imaging unit relative to the dome bubble member and the heat radiated from the heat-emitting film heats an area of the dome bubble member substantially corresponding to current orientation of the imaging unit relative to the dome bubble member.

According to some example embodiments, the heat radiated from the heat-emitting element heats the portion of the dome bubble member sealed by the sealing member.

According to some example embodiments, the imaging unit is rotatable about two axes to change an orientation of the lens unit and of the heat-emitting element relative to the dome bubble member and the heat radiated from the heat-emitting element heats the portion of the dome bubble member sealed by the sealing member according to a current orientation of the imaging unit.

According to some example embodiments, the range of the displacement of the second axis is remote of the center of the dome bubble member.

According to some example embodiments, the first axis is a pan axis and the second axis is a tilt axis and wherein the first axis is stationary.

According to some example embodiments, the second axis is adapted to be displaced in a direction perpendicular to the second axis.

According to some example embodiments, the displacement of the second axis consists essentially of a translational displacement.

According to some example embodiments, the second axis is displaced as the imaging unit is rotated about the second axis.

According to some example embodiments, a displacement of a front end of the imaging unit from a combination of a rotation of the imaging unit about the second axis and a displacement of the second axis defines a displacement path that is substantially concentric with the dome bubble member.

According to some example embodiments, a displacement of an outer portion of the imaging unit as the imaging unit is rotated about the second axis defines a displacement path that maintains a constant distance from a great arc of the dome bubble member corresponding to the current angular position of the imaging unit about the first axis.

According to some example embodiments, the camera device further includes a base member, a support member supporting the imaging unit, the support member being rotatable to define the first axis of rotation of the imaging unit, and the imaging unit is rotatably and displaceably coupled to the support member to define the second axis of rotation of the imaging unit.

According to some example embodiments, the support member comprises at least one bracket arm and the imaging unit is retained within a first slot of the at least one bracket arm, the first slot being oriented in a direction transverse to the second axis and defining the displacement of the second axis.

According to some example embodiments, the first slot is linear.

According to some example embodiments, the imaging unit is further retained within a second slot of the at least one bracket arm, the second slot being curved and defining a combined displacement and rotation of a front end of the imaging unit.

According to some example embodiments, within a plane defined by the angular position of the imaging assembly about the first axis, the first slot is positioned within a circular sector defined by the rotational displacement of the imaging unit within the plane.

According to some example embodiments, the second axis maintains a constant distance from the dome bubble member.

According to some example embodiments, the camera device further includes a sealing member adapted to sealingly engage a portion of the dome bubble member and a front portion of the imaging unit throughout a range of motion of the imaging unit about the first axis and the second axis.

According to some example embodiments, the sealing member is compressed against an inner surface of the dome bubble member and is adapted to maintain a substantially constant amount of compression throughout the range of motion of the imaging unit about the first axis and second axis.

According to some example embodiments, the camera device further includes a heat-emitting element arranged about the lens unit and being adapted to radiate heat for heating the dome bubble member.

According to some example embodiments, the heat-emitting element is a heat-emitting film.

According to some example embodiments, the support member includes a first slot retaining a first pivotal coupling member of the imaging unit, the imaging unit being rotatable about the first pivotal coupling member and the first pivotal coupling member being displaceable within the first slot and a second slot retaining a second coupling member of the imaging unit being displaceable within the second slot and the combination of the rotation of the imaging unit about the first pivotal coupling member, the displacement of the first coupling member within the first slot and the displacement of the second coupling member within the second slot causes the front end of the imaging unit to be displaced within the displacement path that is concentric with the dome bubble member.

According to some example embodiments, the first axis is perpendicular to the second axis and the second axis is substantially parallel to the third axis.

According to some example embodiments, the imaging unit maintains an angular alignment about the first axis with the shroud member as the movable part is rotated about the first axis.

According to some example embodiments, the imaging unit is rotatable about the second axis independently of the pivoting of the shroud member about the third axis.

According to some example embodiments, the shroud member includes a dome-shaped body defining a domed sub-chamber, the body having a cutaway portion, and the imaging unit is adapted to be housed within the domed sub-chamber, a front end of the imaging unit being aligned with the cutaway portion.

According to some example embodiments, the front end of the imaging unit projects through the cutaway portion of the dome-shaped body of the shroud member.

According to some example embodiments, a range of rotation of the imaging unit about the second axis substantially corresponds to an arc-wise length of the cutaway portion of the dome-shaped body of the shroud member.

According to some example embodiments, the shroud member is spaced apart from the dome bubble member.

According to some example embodiments, the shroud member is displaceable between a concealing position and an installation position, in the concealing position the imaging unit being housed within the domed sub-chamber.

According to some example embodiments, in the concealing position a bottom lip of the shroud member is substantially parallel to a bottom lip of the dome bubble member.

According to some example embodiments, the shroud member is pivoted from its concealing position towards a front end of the imaging unit to reach its installation position.

According to some example embodiments, in the installation position, an apex of the shroud member is substantially aligned with a front end of the imaging unit in its minimum tilt angle of rotation about the second axis.

According to some example embodiments, in the installation position, the shroud member generally occupies the same area within a horizontal cross-section of the camera device as an area occupied by the imaging unit.

According to some example embodiments, the camera device includes a stationary part housed within the camera chamber, the stationary part housing one or more connection ports and the movable part is rotatably coupled to the stationary part to define the first axis, the shroud member is positioned above the stationary part relative to the base member, in the concealing position, the shroud member substantially obstructs access to the connection ports of the stationary part in a downward direction towards the base member; and in the installation position, the shroud member permits access to the connection ports of the stationary part in a downward direction towards the base member via a channel rearward of the imaging unit.

According to some example embodiments, the movable part comprises a support member having at least one bracket arm, the imaging unit being rotatably supported at a first location of the bracket arm to define the second axis and the shroud member being pivotally supported at a second location of the bracket arm to define the third axis.

According to some example embodiments, the shroud member comprises a locking mechanism cooperating with the bracket arm to retain the shroud member in its concealing position and wherein the shroud member is movable from its concealing position by an application force on one or more of the shroud member and the bracket arm.

According to some example embodiments, the locking mechanism comprises a latch member adapted to engage a slot of the bracket arm and wherein the application of the force disengages the latch member from the bracket arm.

According to some example embodiments, the shroud member is formed of an infra-red transmissive material.

According to some example embodiments, the shroud member is formed of a resinous material.

According to some example embodiments, wherein the shroud member is substantially opaque to visible light.

According to some example embodiments, the shroud member is formed of plastic resin.

According to some example embodiments, the imaging unit includes a substantially cylindrical body defining an internal chamber, at least a portion of an annular sidewall of the cylindrical body being formed by a thermally conductive material, an image sensor being housed within the internal chamber, a thermally conductive spreader member housed within the internal chamber, a first portion of the spreader member being in thermal contact with the image sensor and a second portion of the spreader member being in thermal contact with the thermally conductive portion of the annular sidewall of the cylindrical body.

According to some example embodiments, heat from the image sensor is transmitted to the thermally conductive portion of the annular sidewall of the cylindrical body via the thermally conductive spreader member.

According to some example embodiments, heat received at the thermally conductive portion of the annular sidewall from the image sensor is dissipated from an outer surface of the portion of the annular sidewall to an environment surrounding the annular sidewall.

According to some example embodiments, the thermally conductive spreader member has a substantially planar body and a plurality of arms extending axially from the planar body, the image sensor is in contact with the planar body, and the arms are in contact with the thermally conductive portion of the annular sidewall.

According to some example embodiments, the thermally conductive portion of the annular sidewall is located forwardly of the image sensor and the plurality of arms extend in a forward axial direction from the planar body to contact the thermally conductive portion of the annular sidewall.

According to some example embodiments, the planar body and the plurality of arms of the thermally conductive spreader member are integrally formed.

According to some example embodiments, the annular sidewall of the cylindrical body comprises a forward portion and a rearward portion, the forward portion is the thermally conductive portion, the rearward portion is thermally insulating, and the image sensor is positioned within the internal chamber at a longitudinal position corresponding to the rearward portion.

According to some example embodiments, the thermally conductive portion of the annular sidewall of the cylindrical body is a lens cowling of the imaging apparatus.

According to some example embodiments, the thermally conductive portion of the annular sidewall of the cylindrical body is formed of a material chosen from aluminum, steel, and magnesium.

According to some example embodiments, heat dissipated from an outer surface of the portion of the annular sidewall has wavelengths in the infra-red range, the heat being transmitted through the infra-red transmissive shroud member to reach an inner surface of the dome bubble member.

BRIEF DESCRIPTION OF THE DRAWINGS

The detailed description refers to the following figures, in which:

FIG. 3B illustrates a section view along the line A-A of the imaging unit according to the example embodiment;

FIG. 10B illustrates a side elevation view of the imaging unit positioned at its maximum tilt angle about the second axis according to one example embodiment;

Figure 1:
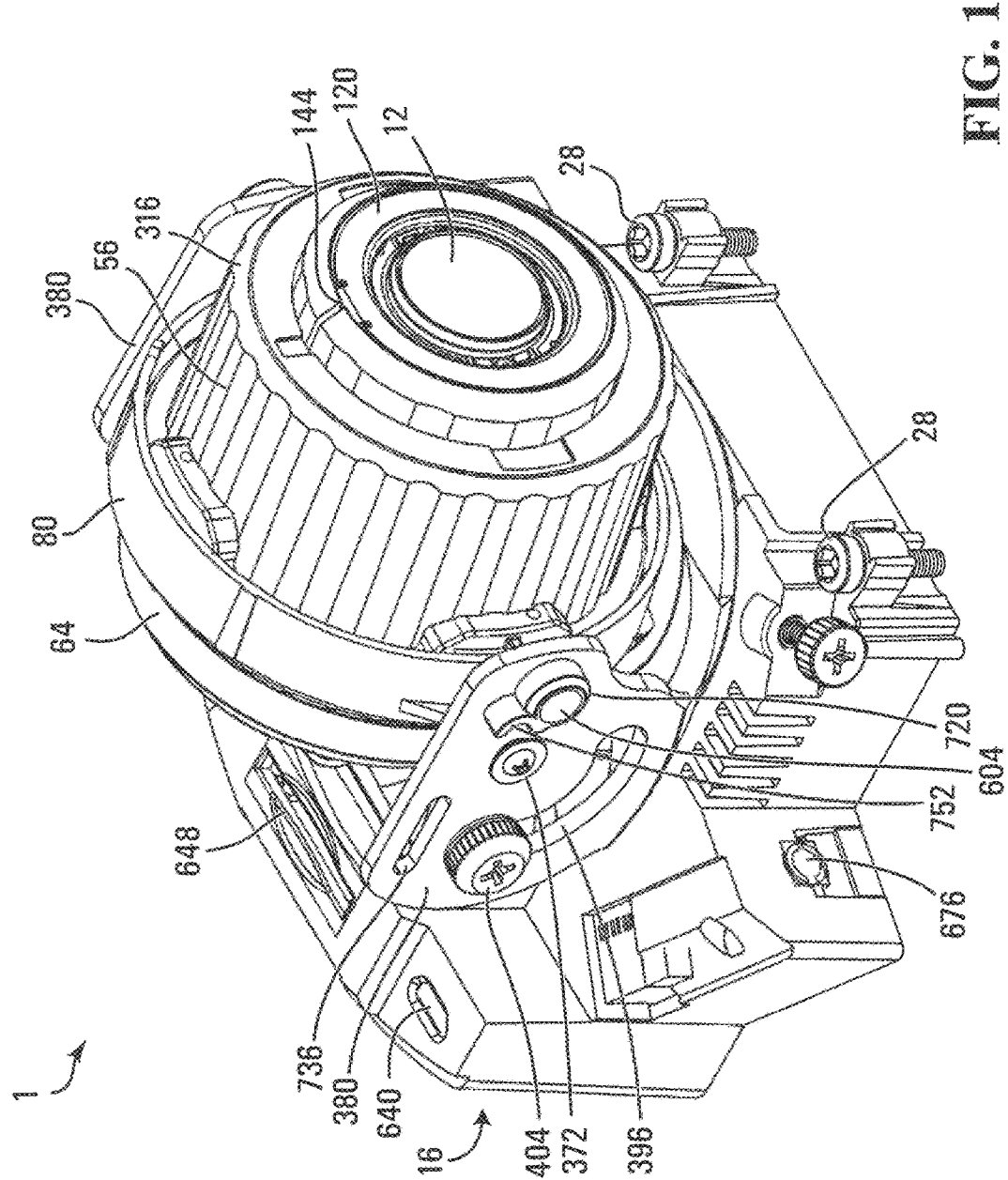
FIG. 1 illustrates a perspective view of an operational unit of a camera according to one example embodiment.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The term "approximately" as used herein mean a reasonable amount of deviation of the modified term such that the end result is not significantly changed. These terms of degree should be construed as including a deviation of at least ±10% of the modified term if this deviation would not negate the meaning of the word it modifies.

The terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices are directly connected to one another or connected to one another through one or more intermediate elements or devices via an electrical element, electrical signal or a mechanical element depending on the particular context.

Thus when an element is herein referred to as being "coupled" to another element, it may be directly coupled to the other element or intervening elements may be present. By the same token, it will be understood that when an element is herein referred to as being "connected" or "in communication with" another element, it can be directly connected to or directly in communication with the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

Referring now to FIG. 1, therein illustrated is a perspective view of an operational unit 1 of a camera device 4 according to various examples. The operational unit 1 includes an imaging unit 8 that is operational to capture images and video of a scene. The imaging unit 8 includes a lens unit 12 that focuses light incident upon it and an image sensor 14 for capturing the focused light. The image sensor 14 may further output image data that is representative of the captured light. For example, the image sensor may be a CMOS, NMOS or CCD. The image sensor includes associated circuitry 15 (e.g. PCB) for formatting the outputted image data.

The operational unit 1 further includes a data management unit 16 that is in signal communication with the imaging unit 8 to receive the image data from the imaging unit 8. The data management unit 16 is further configured to carry out various management operations on the received image data. Management of the received image data may include one or more of storing the image data locally within the data management unit 16, processing the image data, and communicating the image data to an external device, such as over a network (either the raw image data or the processed image data). For example, the processing image data may include, but is not limited to, image processing operations, analyzing, managing, compressing, encoding, storing, transmitting and/or playing back the image data.

The operational unit 1 may include a movable part and a stationary part. The movable part is coupled to the stationary part to be movable relative to the stationary part. The movable part includes the imaging unit 8, whereby the imaging unit 8 can be moved with movement of the movable part. Accordingly, the imaging unit 8 is moved in relation to the stationary part.

The stationary part may house the data management unit 16. For example, and as illustrated, one or more data ports of the data management unit 16 are housed within the stationary part. The stationary part may further include one or more fasteners 28 that are adapted to cooperate with a camera base member 32 to secure the stationary part to the camera base member 32. Accordingly, the movable part and the imaging unit 8 are also secured to the camera base member 32 via the stationary part.

Figure 2:
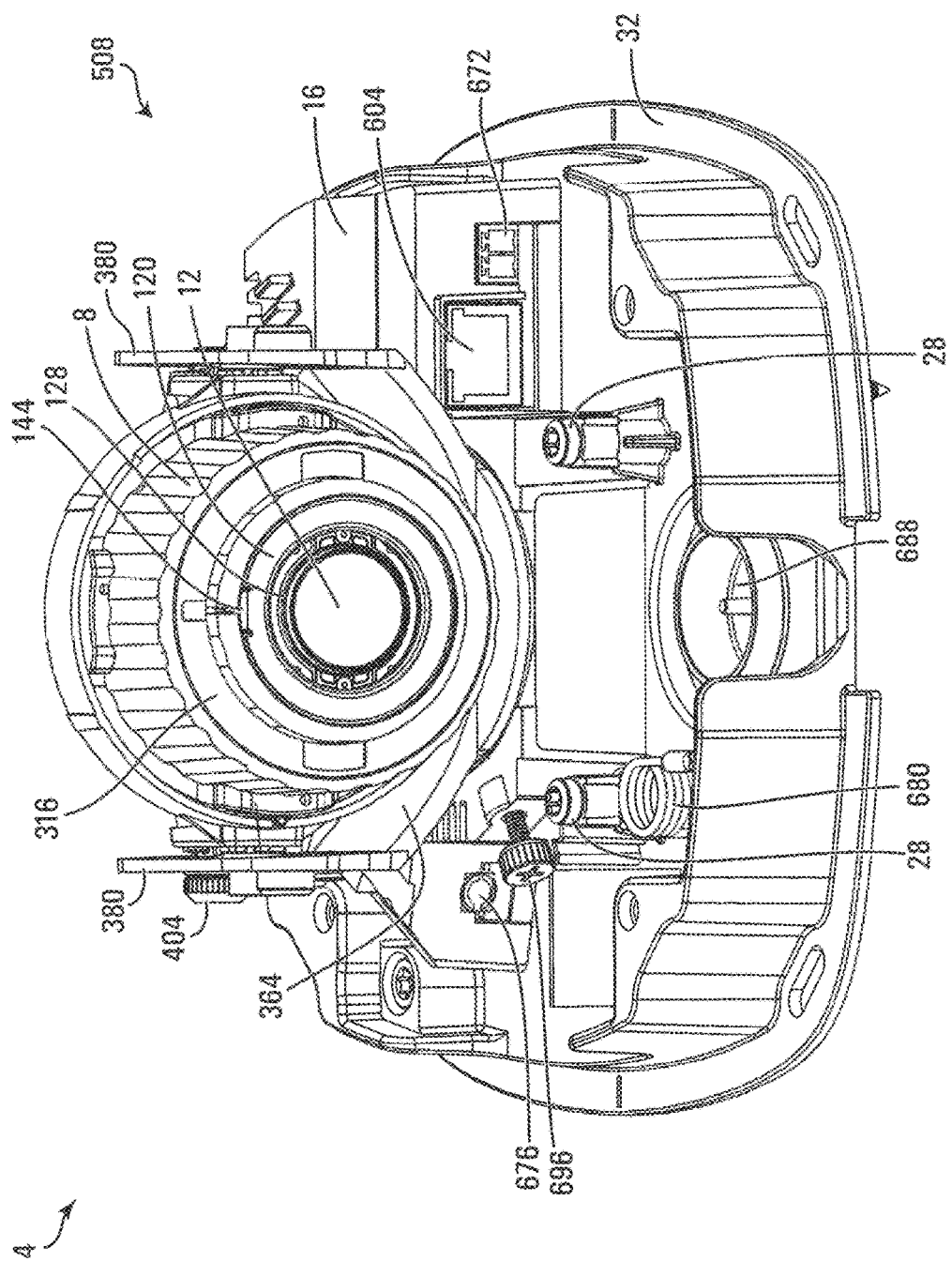
FIG. 2 illustrates a perspective view of the example operational unit being secured to a base member according to one example embodiment.

Referring now to FIG. 2, therein illustrated is a perspective view in which an example operational unit 1, including the stationary part and the imaging unit 8, have been secured to the base member 32. For example, and as illustrated, the operational unit 1 is secured via fasteners 28.

Figure 3A:
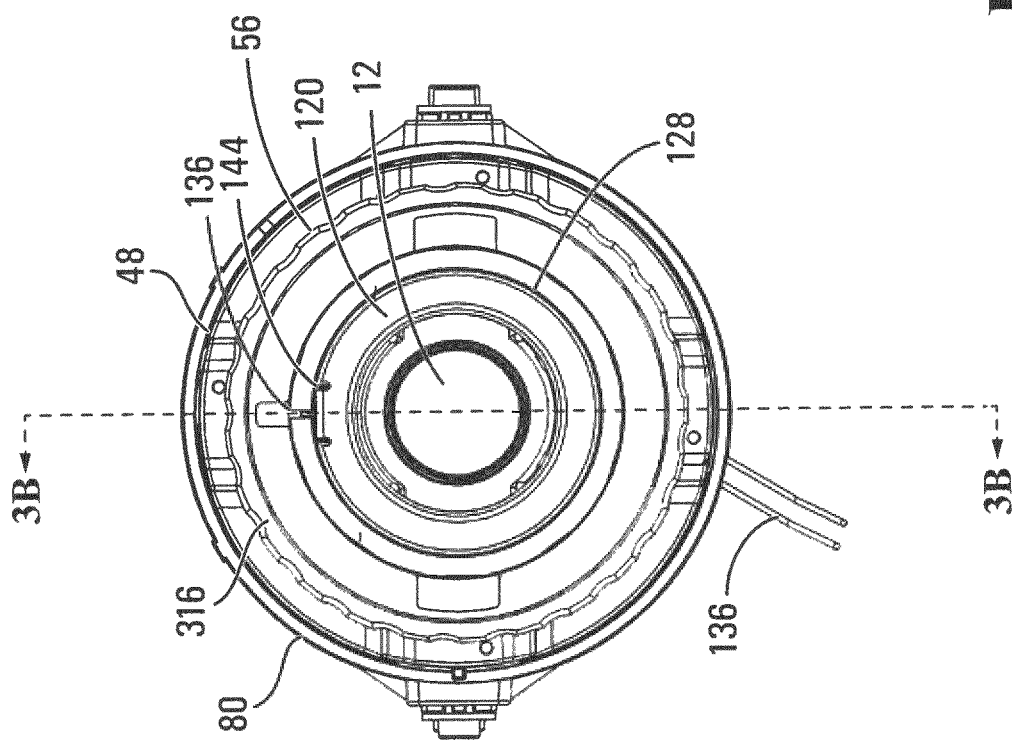
FIG. 3A illustrates a plan view of an imaging unit according to one example embodiment.

Referring now to FIGS. 3A and 3B, therein illustrated is a front elevation view and a section view along the lines A-A of the imaging unit 8 according to various example embodiments. (Note: internal components inside of the area defined by dashed lines 72 are not illustrated for convenience of illustration.) The imaging unit 8 includes an imaging body 48 that houses one or more components of the imaging unit 8. For example, the imaging body 48 includes front walls 56 and rear walls 64 that are adapted to be cooperatively coupled to one another to define an imaging sub-chamber. Each of the front walls 56 and rear walls 64 may be annular, whereby the imaging body 48 has a substantially cylindrical body.

The imaging unit 8 further includes a support ring 80. The imaging body 48 is rotatably supported within the support ring 80, whereby the imaging body 48 can be rotated relative to the support ring 80. Rotation of the imaging body 48 relative to the support ring 80 may be useful to adjust the orientation of the imaging body 48 (e.g. for when the camera is mounted sideways).

The imaging body 48 houses a lens unit 12, an image sensor 14, and the associated circuitry 15. The lens unit 12 is located at a front end 112 of the imaging unit 8. For example, the lens unit 12 may form part of a front facing surface 128 of the front end 112 of the imaging unit 8.

Referring now to FIGS. 1 to 3B simultaneously, the imaging unit 8 further includes a heat-emitting element 120 that is adapted to radiate heat. The heat-emitting element 120 is positioned and oriented so as to radiate heat in a direction 124 forward of the lens unit 12. For example and as illustrated, the heat-emitting element 120 is located on the front facing surface 128 of the front end 112 of the imaging unit 8.

According to various exemplary embodiments, the front facing surface 128 of the front end 112 of the imaging unit 8 includes an annular bezel that surrounds the lens unit 12. The bezel may be substantially flat and extend circumferentially about the lens unit 12. Accordingly, the heat-emitting element 120 is disposed over the bezel. For example, the heat-emitting element 120 may be secured to the annular bezel using a suitable adhesive.

According to various example embodiments, the heat-emitting element 120 is a heat-emitting film. The heat-emitting film may include a thin film having formed therein a conductive coating. The heat-emitting film may be a flexible heat-emitting film. For example, the heating-emitting film may be metal or carbon laminated with one of silicon, polyimide, or polyester.

According to various example embodiments, the heat-emitting film includes two polymer film layers that are laminated to one another. A resistive metal part is sandwiched between the two polymer film layers. The resistive metal part may be resistive foil or printed carbon ink. The outer surface of one of the layers may have an adhesive backing.

In some examples, the polymer film layers may be formed of a dark color, such as a substantially black color. The dark color of the polymer film layers promotes heat radiation from the resistive metal part of the heat-emitting film. Furthermore, the dark color assists in visually concealing the resistive metal part within the film.

According to various example embodiments, the heat-emitting element 120 outputs at least approximately 0.1 W of power.

In some example embodiments, the heat-emitting element 120 outputs approximately 0.3 W of power.

In some example embodiments, the heat-emitting element 120 outputs up to approximately 0.5 W of power.

For example, and as illustrated, the heat-emitting film 120 is adhered to be flush against the bezel of the front facing surface 128 of the imaging unit 8. It will be appreciated that due to the thinness of the heat-emitting film 120, the height of the front facing surface 128 of the imaging unit 8 is not substantially increased.

Referring back to FIG. 3, the heat-emitting element 120 is powered via an electrical conductive path that extends through the imaging housing 48. The electric conductive path may be provided by an electrical wire 136 that extends through the length of the imaging housing 48. A first end of the electrical wire 136 projects through an opening 144 in the imaging housing 8 to be connected to the heat-emitting film 120. For example, the opening 144 may be formed in the front facing surface 128 of the imaging unit 8.

The electrical wire 136 may further extend through an opening 152 formed in a rear wall 160 of the imaging unit 8. The opening 152 may already be receiving a data cable that provides signal communication between the associated circuity 15 and the data management unit 16. Accordingly a second end of the electrical wire 136 may be connected to a power source, which may be a power source of the data management unit 16. In some example embodiments, the data cable for providing signal communication and the electric wire 136 may be integrated together into a single cable.

Figure 4:
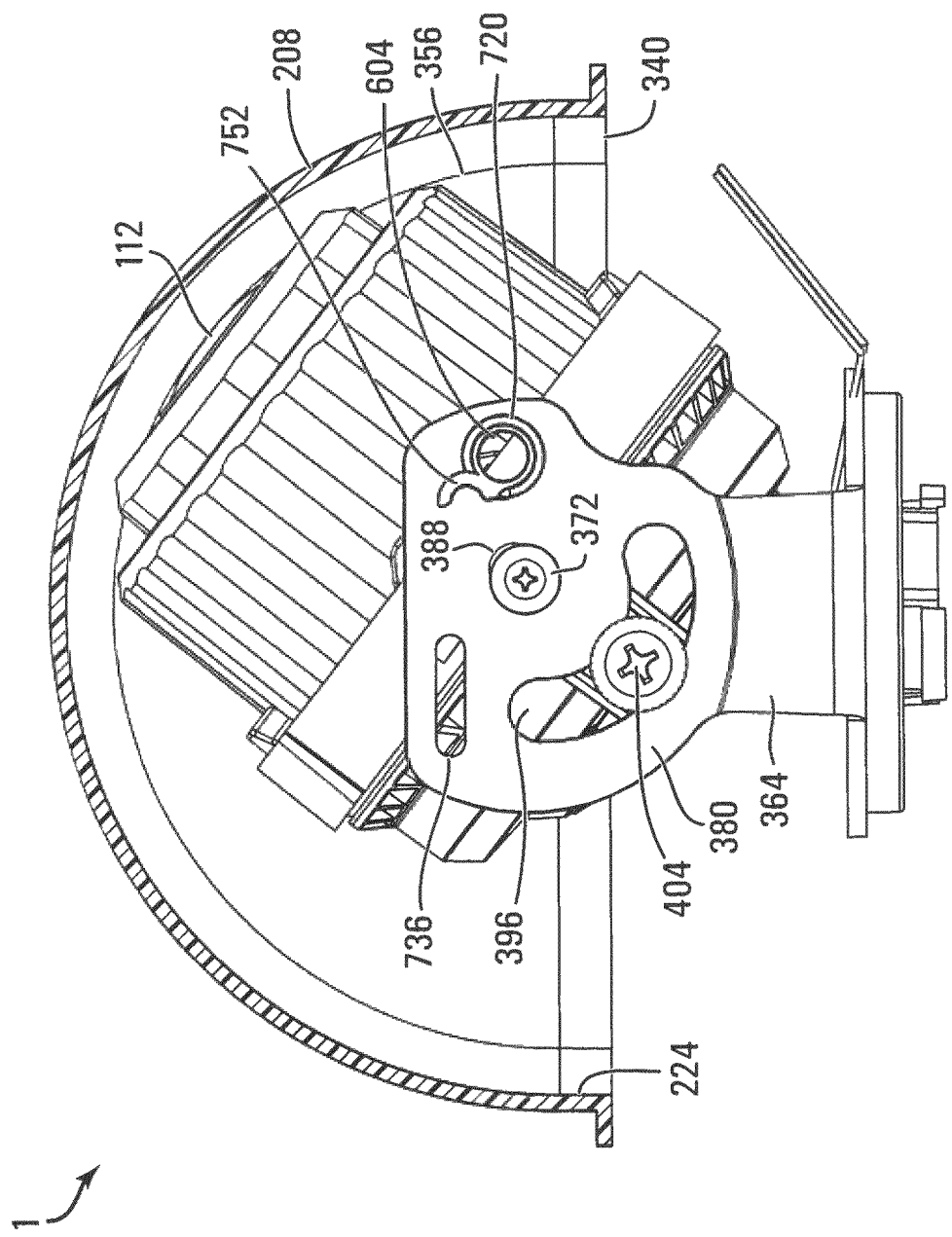
FIG. 4 illustrates a side elevation view of an assembled camera device according to one example embodiment.

Referring now to FIG. 4, therein illustrated a side elevation view of an assembled camera device 4 according to various example embodiments. The assembled camera device 4 includes a dome bubble member 208. The dome bubble member 208 can be attached to the camera base member 32 to define together a camera chamber 216. When assembled, the imaging unit 8 is housed within the camera chamber 216. The data management unit 16 may also be housed within the camera chamber 216.

The dome bubble member 208 may be generally domed shaped. For example, the dome bubble member 208 has a shape that corresponds to a portion of a sphere, such as a spherical cap or hemisphere. Accordingly, the dome bubble member 208 may be defined by a center and a diameter.

In some example embodiments, the dome bubble member 208 is adapted to shield inner components of the camera device 4 such as the imaging unit 8 and the data management unit 16 from exterior environmental forces. For example, when coupled to one another, the dome bubble member 208 and the base member 32 acts to seal the camera chamber 216 and provides a substantial degree of protection against ingress of solid particles and liquids. For example, the sealed camera device 1 may have an IP (Ingress Protection) rating of at least 5 for solid particles and an IP rating of at least 5 for liquids. Accordingly, the camera device 1 may be used in outdoor conditions, whereby internal components of the device are substantially protected against environmental forces.

The dome member 208 is at least partly translucent. This permits light from outside the camera device 1 to pass through the dome member 208 and be captured by the imaging unit 8. In some examples, the dome member 208 may be transparent.

In other examples, the dome member 208 may be hazy or smoked, which makes it more difficult for a human to perceive the orientation of the imaging unit 8 within the camera chamber 216.

According to various example embodiments, the dome member 208 may include a substantially opaque shroud layer having a cut-out portion. Accordingly, light penetrates into the chamber 216 via the cut-out portion of the shroud layer. The shroud layer further contributes to visually concealing the elements of the camera device inside the chamber 216. In some example embodiments, the shroud layer may be attached or embedded within the dome bubble member 208. In other example embodiments, and as described elsewhere herein, the shroud layer may be a shroud member that is part of the movable part and is pivotal about a third axis.

In some examples, the shroud layer is formed of a material that is transmissive to light in at least a portion of the infra-red range. The shroud member may also be substantially opaque to visible light. For example, the shroud layer may be formed of a resinous material, such as plastic resin.

Continuing with FIG. 4, when the camera device 4 is assembled, the front end 112 of the imaging unit 8 is located in proximity of an inner surface 224 of the dome bubble member 208, whereby the lens unit 12 is facing the inner surface 224 of the dome bubble member 208. For example, the front facing surface 128 of the imaging unit 8 is facing the inner surface 224 of the dome bubble member 208. The imaging unit 8 is configured so that within its range of movement relative to the stationary part, it maintains its orientation of facing a corresponding portion of the inner surface 224 of the dome bubble member 208 (e.g. the front facing surface of the imaging unit continuously faces the inner surface 224 of the dome bubble member 208).

Since the heat-emitting element 120 is configured to radiate heat in a direction 124 forward of the lens unit 8, the radiated heat contacts the inner surface 224 of the dome bubble member 208 and may cause heating of the dome bubble member 208.

It was observed that heating of the dome bubble member 208 with the heat radiated from the heat-emitting element 120 warms the inner surface 224 of the dome bubble member, which contributes to causing evaporation of water vapor that may form on the inner surface 224. The evaporation of water vapor may improve the optical path from the environment outside of the camera device 4 to the lens unit 12.

It was also observed that warming the air between the heat-emitting element 120 and the inner surface 224 raises the dew-point of elements located in proximity of the heat-emitting element 120, which reduces condensation on the surfaces of these proximately located elements.

It was also observed that heat radiated from the heat-emitting element 120 that contacts the inner surface 224 is further conducted through the dome bubble member 208 to an outer surface of the dome bubble member 208, thereby heating the outer surface of the dome bubble member 208. This heating may contribute to removing or restricting ice formation on the outer surface of the dome bubble member 208.

According to various example embodiments, the radiating surface of the heat-emitting element 120 is located in proximity to the inner surface 224 of the dome bubble member 208. The close location of the radiating surface of the heat-emitting element 120 to the inner surface 224 of the dome bubble member 208 reduces the amount of thermal energy that needs to be radiated from the heat-emitting element 120 to provide a desired amount thermal energy to an area of interest of the dome bubble member 208. Locating the radiating surface of the heat-emitting element 120 close to the inner surface 224 of the dome bubble member 208 reduces the distance between the radiating surface of the heat-emitting element 120 and the inner surface 224. The close location reduces the waste heat that is not transmitted to the dome bubble member 208.

The area of interest of the dome bubble member 208 is a portion of the dome bubble member 208 that corresponds to a current orientation of the lens unit 12 of the imaging unit 8. It will be appreciated that a current area of interest of the dome bubble member 208 will change with movement of the imaging unit 8 about the stationary part of the operational unit 1. For example, the area of interest may correspond to a projection of the field of view of the lens unit 12 onto the dome bubble member 208. Where imaging unit 8 or lens unit 12 includes a zoom function, the area of interest may correspond to a projection of the widest field of view of the lens unit 12 onto the dome bubble member 208. For example, where a field of view may be represented as an inverted cone shape from the lens unit 12, the area of interest substantially corresponds to the intersection of the inverted cone with the dome bubble member 208. Accordingly, the area of interest represents an elliptical or circular portion of the dome bubble member 208.

It will be appreciated that the area of interest of the dome bubble member 208 depends on the current orientation of the imaging assembly 8. Accordingly, the area of interest corresponds to the projection of the lens unit 12 or field of view onto the dome bubble member according to a current orientation of the imaging assembly 8.

While the radiating surface of the heat-emitting element 120 is located in proximity of the inner surface 224 of the dome bubble member 208, it is spaced apart from the inner surface 224 of the dome bubble member 208 to define a gap 228 therebetween. Accordingly, heat radiated from the heat-emitting element 120 is radiated to the inner surface 224 of the dome bubble member 208 across the gap 228.

According to various example embodiments, the height of the gap 228 between the radiating surface of the heat-emitting element 120 and the inner surface 224 of the dome bubble member 208 is between approximately 2 mm and approximately 20 mm.

According to various example embodiments, the height of the gap between the radiating surface of the heat-emitting element 120 and the inner surface of the dome bubble member 208 is between approximately 4 mm and approximately 16 mm.

According to various example embodiments, the height of the gap between the radiating surface of the heat-emitting element 120 and the inner surface 224 of the dome bubble member 208 is at most approximately 15 mm.

According to various example embodiments, the movable part of the camera device 8 is configured so that within the range of movement of the imaging unit 8 relative to the stationary part, the front end 112 of the imaging unit 8 maintains a substantially constant distance between itself and the inner surface 224 of the dome bubble member 208. Accordingly, the radiating surface of the heat-emitting element 120 also maintains a gap of substantially constant height between itself and the inner surface 224 of the dome bubble member 208.

It will be understood that according to various example embodiments, the radiating surface of the heat-emitting element 120 is spaced apart from the inner surface 224 of the dome member 208 in that the radiating surface of the heating-emitting element 120 does not directly contact the inner surface 224 of the dome member 208. That is, the radiating surface of the heat-emitting element 120 is exposed to the gap 228.

It will be further understood that according to various example embodiments where the radiating surface of the heat-emitting element 120 is exposed, the thermal path between the radiating surface of the heat-emitting element 120 and the inner surface of the dome member 208 may be free of (i.e. does not include) an intermediate heat transmitting member. For such example embodiments, heat is not transmitted to the dome bubble member 208 via any heat transmitting member that is in contact with the dome bubble member 208.

An impact of a thermal path being free of any intermediate heat transmitting member may be that it avoids the problem of wear and tear of any intermediate heat transmitting member due to constant heating of the intermediate heat transmitting member.

It was observed that radiating the heat from the heat-emitting element 120 to the inner surface 224 of the dome bubble member 208 across the gap 228 provides a more uniform transmission of heat across the area of interest of the dome bubble member 208. By contrast, the use of an intermediate heat transmitting member may cause the heat to be concentrated onto the contact points of the heat transmitting member with the dome bubble member 208.

For example, where the radiating surface of the heat-emitting element 120 has an annular shape, the radiated heat spreads in both the radially inwardly direction and the radially outwardly direction as it is transmitted across the gap 228 to the area of interest of the dome bubble member 208. The radially inwardly spreading of the radiated heat causes heat to be transmitted to an area of the inner surface 224 of the dome bubble member 208 that corresponds to an inner circle of the projection of the annular radiating surface onto the inner surface 224. Furthermore, radially outwardly spreading of the radiated heat causes heat to be transmitted to a ring-shaped area of the inner surface 224 of the dome bubble member 208 that surrounds (i.e. has a greater diameter than) the projection of the annular radiating surface onto the inner surface 224. It will be appreciated that the radially inwardly spreading of the heat may cause the heat to cover a portion of the field of view of the lens unit 12 that is located inside the projection of the annular radiating surface of the heat-emitting element 120 onto the inner surface 224. Similarly, the radially outwardly spreading of the heat may cause the heat to cover a portion of the field view of the lens unit 12 that is located outside of the projection of the annular radiating surface of the heat-emitting element.

In addition to the thin layer of heat-emitting film being space efficient (e.g. thin layer), the use of heat-emitting film 120 according to various example embodiments may radiate heat in a particular manner that is notable. Due to the heat-emitting resistive metal of the heat-emitting film 120 being drawn over a surface of the heat-emitting film 120, heat is radiated from a planar surface of the heat-emitting film 120. This is in contrast to other types of heat-emitting sources, which may radiate heat in all directions from a point source or a linear source. Accordingly, heat is radiated more uniformly across a wider area than may be provided by a point or linear heat source. Similarly, heat is radiated more directionally from the heat-emitting film 120 while having some level of radial spreading. While the heat radiated from the heat-emitting film 120 experiences some radial spreading, this spreading is sufficiently limited so as to be well suited to transmit heat to the area of interest of the dome bubble member 208 while limiting the amount of excess heat that is not effective for heating the area of interest of the dome bubble member 208.

It will be understood that excess heat introduced into the camera chamber 216 that is not effective for heating the area of interest of the dome bubble member 208 may be undesirable for a variety of reasons. The excess heat represents inefficient use of power of the camera device 4, which itself may be power-restricted. Furthermore, excess heat within the camera chamber 216 may affect performance of other electronic components housed within the camera chamber 216. In particular, the performance of the image sensor 14 may be affected when exposed to excessive heat.

Figure 5:
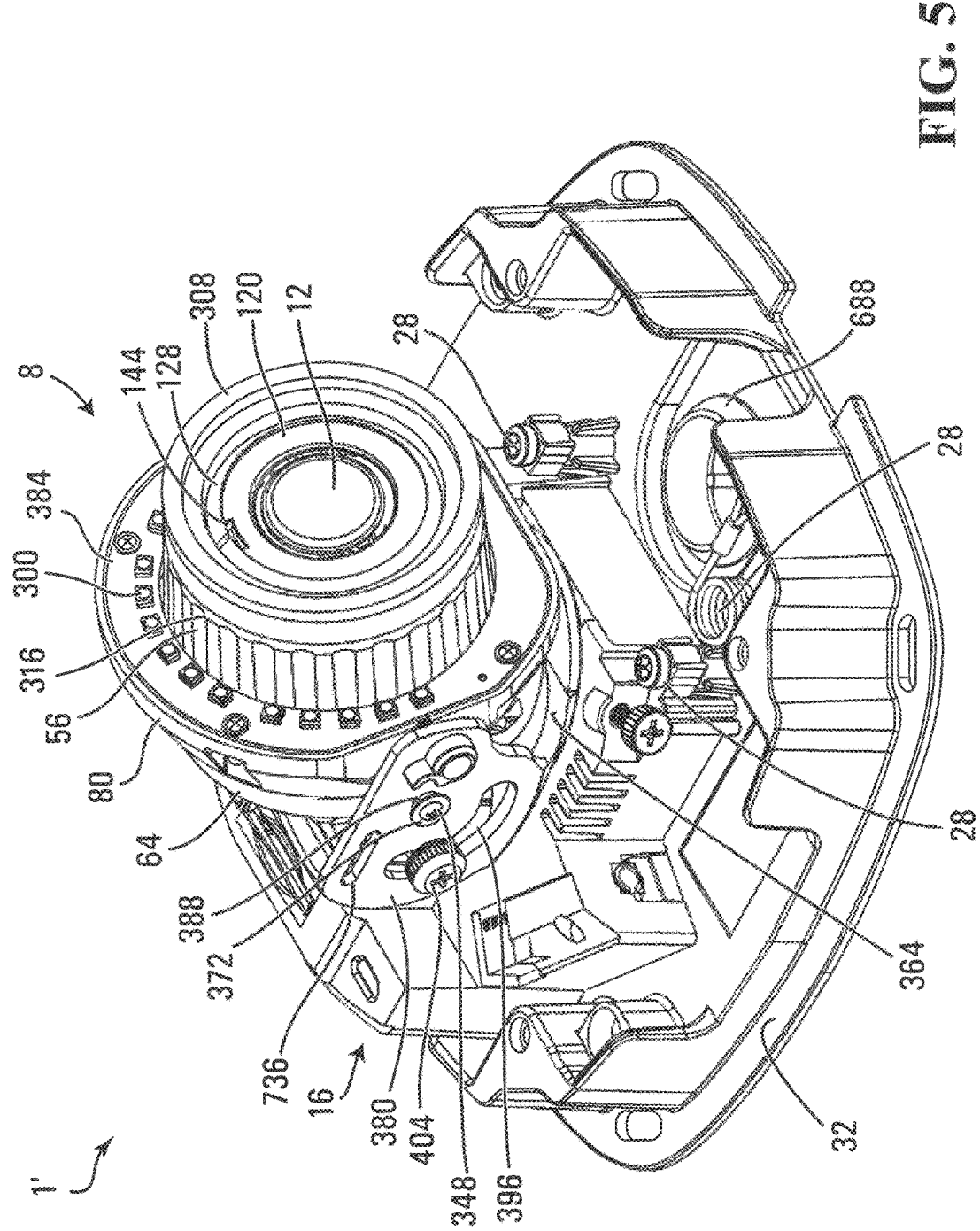
FIG. 5 illustrates a perspective view of an operational unit of a camera device according to alternative example embodiment.

Referring now to FIG. 5, therein illustrated is a perspective view of an operational unit 1' of a camera device according to alternative example embodiments. The alternative operational unit 1' is similar to the operational unit 1 described herein according to various example embodiments with reference to FIGS. 1 to 4 and various properties of the operational unit 1 are also applicable to the alternative operational unit 1'. In addition to the elements of the examples of the operational unit 1 described herein, the alternative operational unit 1' further includes one or more infra-red light sources 300 for emitting light in the infra-red range. Furthermore, the image sensor 14 is configured to be sensitive to light in the infra-red range. When in operation, the emitted light from the infra-red light sources 300 illuminates a scene and the reflected infra-red is captured by the image sensor 16.

For example, and as illustrated in FIG. 5, a plurality of infra-red lights 300 are arranged about the outside of the imaging body 48. The infra-red lights 300 may be formed along a circumferential arc about the imaging body 48. For example, the plurality of infra-red lights 300 may be arranged on a forwardly oriented surface of the support ring 80 to emit infra-red light in a forward facing direction 124 of the imaging unit 8. Positioning the infra-red lights 300 on the support ring 80 causes the infra-red lights 300 to be moved with the movement of the moving part but the infra-red lights 300 are not rotated relative to the support ring 80.

Continuing with FIG. 5, the alternative operational unit 1' of the camera device 4 further includes an annular sealing member 308. The annular sealing member 308 is formed of an elastic and compressible material. The material may also be a heat-insulating material. For example, the annular sealing member 308 may be formed of a material chosen from compressible plastic or polymer, foam, molded rubber, urethane foam, closed cell foam and open cell foam.

The annular sealing member 308 is arranged circumferentially on the front end 112 of the imaging unit 8. As illustrated, the annular sealing member 308 has an inner diameter that is greater than the diameter of the lens unit 12 and surrounds the outer circumference of the lens unit 12. Similarly, the annular sealing member 308 has an inner diameter that is greater than or equal to the outer diameter of the radiating surface of the heat-emitting element 120.

Furthermore, the annular sealing member 308 has a sufficient axial thickness (i.e. height of the annular sealing member 308 in the forward direction 124 of the imaging unit 8) such that a distal end 312 of the sealing member 308 represents the outermost surface of the imaging unit 8. That is, the distal end 312 of the sealing member 308 extends in the forward direction 124 of the imaging unit 8 past an outermost surface of the lens unit 12 and past an outermost surface of the heat-emitting element 120.

According to various example embodiments, the annular sealing member 308 is coupled to one or more outer surfaces of the front walls 56 of the imaging body 48. For example, in the illustrated example, the annular sealing member 308 is secured to a front facing lip 316 of the front walls 56. The annular sealing member 308 may be secured using a suitable adhesive. However, it will be understood that the annular sealing member 308 may be coupled to the imaging body 48 according to any other suitable method.

Figure 6:
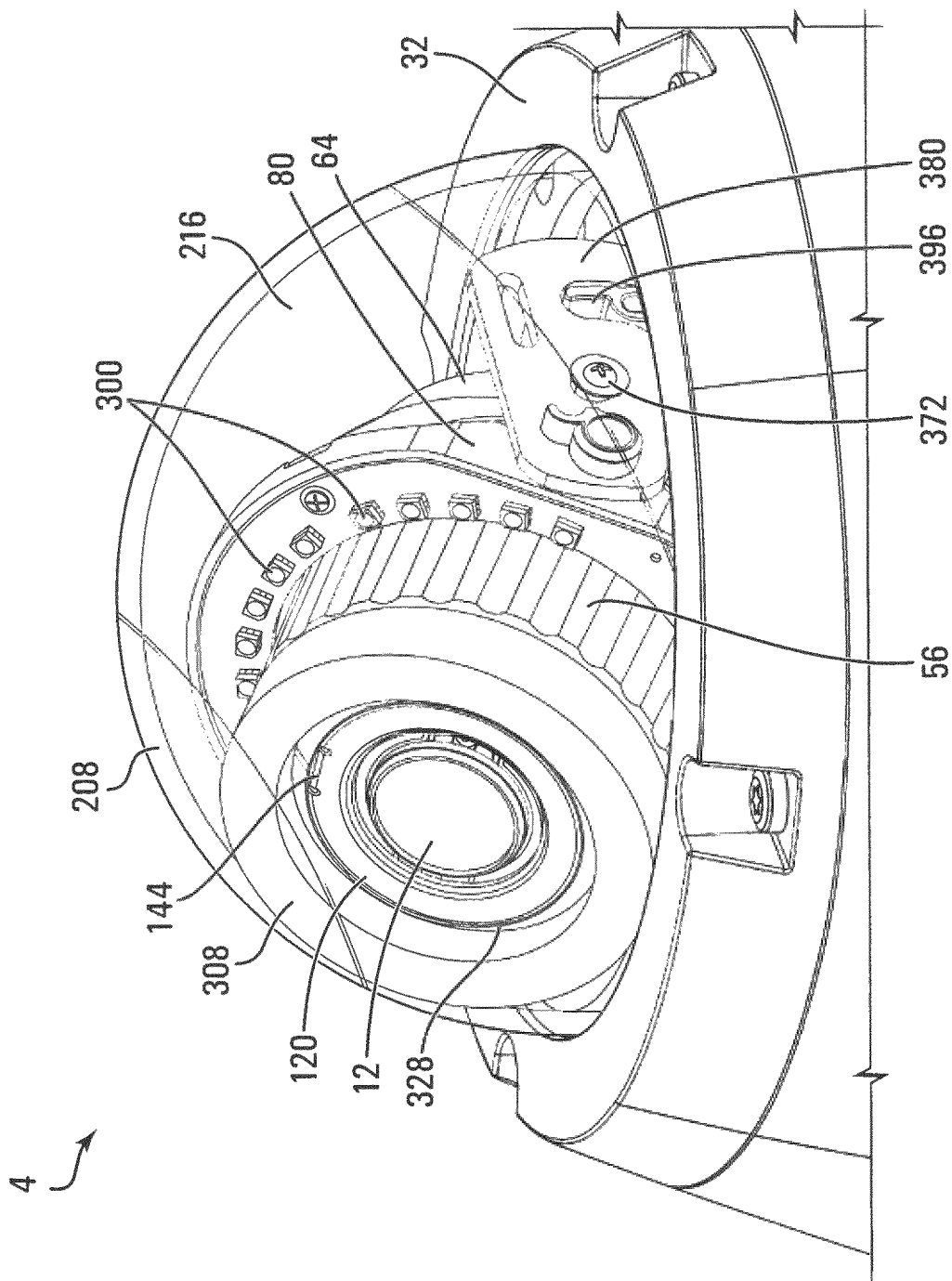
FIG. 6 illustrates a perspective view of an assembled camera device according to an example embodiment having the example alternative operational unit.
Figure 7:
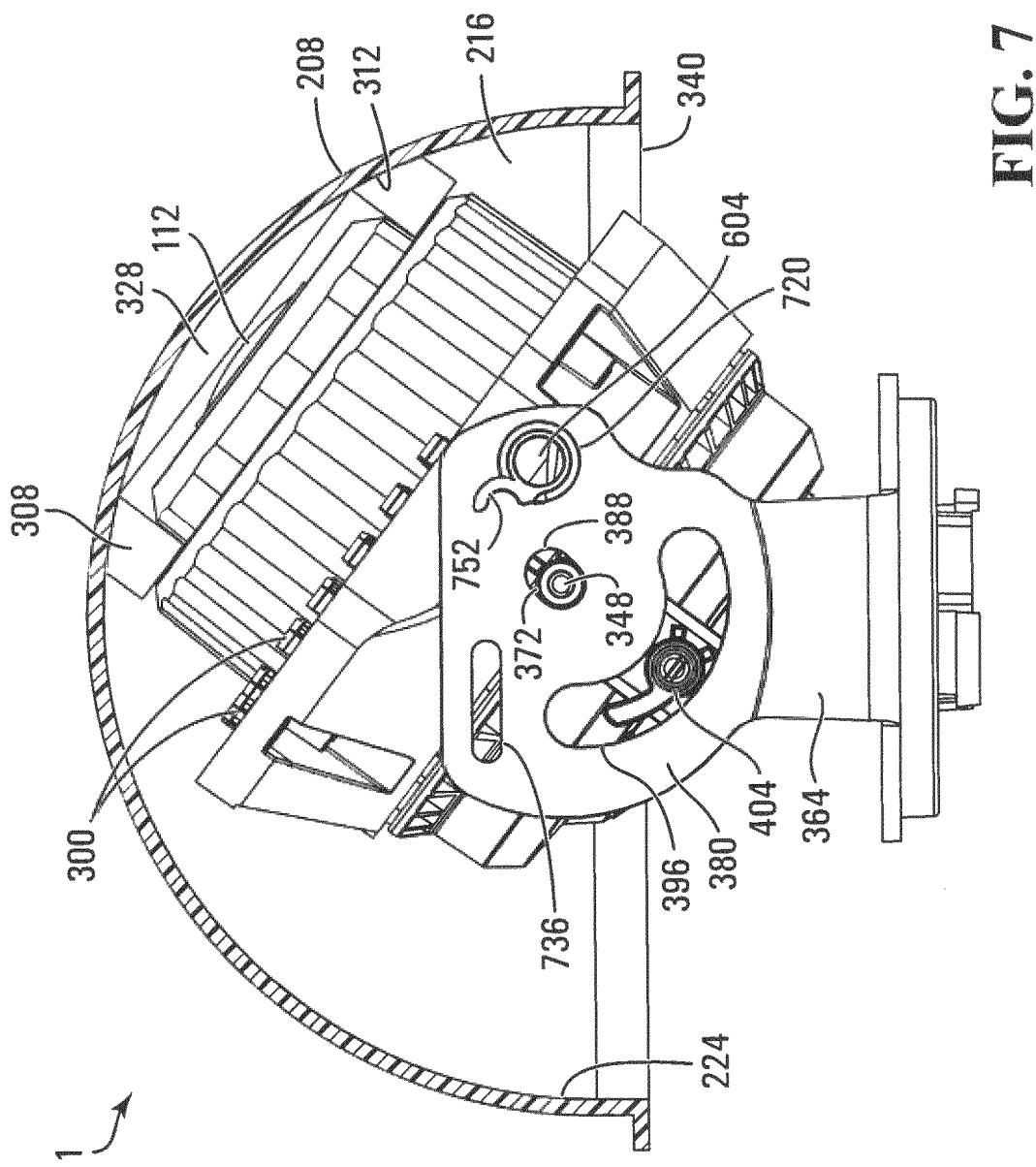
FIG. 7 illustrates a side section view of an operational unit of a camera device according to an example embodiment having the example alternative operational unit.

Referring now to FIGS. 6 and 7 together, therein illustrated are a perspective view and side section view, respectively, of an assembled camera device 4 according to various example embodiments having the alternative operational unit 1'. When the dome bubble member 208 is appropriately secured to the base member 32 of the alternative assembled camera device 4, the inner surface 224 of the dome bubble member 208 sealingly engages the distal end 312 of the annular sealing member 308. Due to the contacting of the dome bubble member 208 with the annular sealing member 308, the annular sealing member 308 is compressed along its entire circumference. The compression of the annular sealing member 308 ensures that a tight seal is formed with the inner surface 224 of the dome bubble member 208.

The sealing engagement of the annular sealing member 308 with the inner surface 224 of the dome bubble member 208 assists in reducing the amount of infra-red light emitted from the one or more infra-red light sources 300 that is reflected off of the dome bubble member 208 and that is captured by the image sensor 16. This reflected infra-red light represents rays of light emitted from the one or more infra-red light sources 300 that are incident on the dome bubble member 208 with an angle of incidence that is greater than the critical angle. It will be appreciated that this reflected infra-red light is not representative of the scene to be captured. As a result, capturing this reflected infra-red reduces the fidelity of the image captured compared to the scene to be captured. The annular sealing member 308 is located within the optical path of either the incident ray or reflected ray of a significant portion of the infra-red light limited emitted from the one or more infra-red light sources 300. Accordingly, the annular sealing member 308 blocks a significant portion of undesired infra-red light that would otherwise reach the lens unit 12.

The sealing engagement of the annular sealing member 308 with a corresponding portion of the dome bubble member 208 defines a sealed sub-chamber 328. The lens unit 12 and the heating emitting unit 120 are both located within the sealed sub-chamber 328. Accordingly, the heat radiated from the heating-emitting element 120 is substantially contained with the sealed sub-chamber 328. This causes the volume of air located within the sealed sub-chamber 328 to be heated, which further causes the sealed portion of the dome bubble member 208 to be heated. Heating of the dome bubble member 208 may be further promoted by the heat-insulating property of the annular sealing member 308 according to some example embodiments, which restricts transmission of heat via the annular sealing member 308 to portions of the camera chamber 216 outside the sealed sub-chamber 328.

The sealed portion of the dome bubble member 208 corresponds to the area of the dome bubble member 208 that is defined and circumscribed by the annular sealing member 308. This sealed portion of the dome bubble member 208 corresponds to the projection of the field of view of the imaging unit 8 onto the dome bubble member 208 according to the current orientation of the imaging unit 8. Since the annular sealing member 308 occludes the imaging unit 8, it may delimit the outer boundary of the field of view of the imaging unit 8 and the area of interest of the dome bubble member 208. The field of view of the imaging unit 8 may be smaller than the sealed portion of the dome bubble member 208. Accordingly, the providing of the annular sealing member 208 causes a substantial amount of the heat radiated from the heat-emitting element 120 to be transmitted to the area of interest of the dome bubble member 208. Furthermore, since the sealing annular member 308 is secured to the imaging unit 8 and is movable with the movement of the imaging unit 8, the sealing annular member 308 will always defined a sealed portion of the dome bubble member 208 that corresponds to the field of view of the imaging unit 8.

According to various example embodiments, movement of the imaging unit 8 about the stationary part includes a first rotation about a first axis 332 and a second rotation about a second axis 348.

When the dome bubble member 208 is appropriately coupled to the base member 32, the first axis 332 is substantially aligned (e.g. is collinear) with a center of the dome bubble member 208 that is spherical. For example, the first axis 332 may be a substantially vertical axis (i.e. perpendicular to a horizontal plane 336 defined by a bottom lip 340 of the dome bubble member 208). The first axis 332 may correspond to a pan axis of the imaging unit 8 within the camera device 4.

When the dome bubble member 208 is appropriately coupled to the base member 32, the second axis 348 is offset from the center of the spherical dome bubble member 208. Furthermore, the second axis 348 is displaceable in at least one direction transverse to the second axis 348. The second axis 348 may be perpendicular to the first axis 332 and also parallel to the horizontal plane 336 defined by the bottom lip 340 of the dome bubble member 208). The second axis 348 may correspond to a tilt axis of the imaging unit 8 within the camera device 4.

Due to the first axis 332 being aligned with the center of the spherical dome bubble member 208, the outer portion of the imaging unit 8 maintains a substantially constant distance between itself and the inner surface 216 of the dome bubble member 208 when the imaging unit 8 is rotated about the first axis 332. For example, a center of the lens unit 12 and the radiating surface of the heat-emitting element 120 each maintain a respective substantially constant distance with the inner surface 224 of the dome bubble member 208 as the imaging unit 8 is rotated about the first axis 332.

According to various example embodiments wherein the annular sealing member 308 is provided, a substantially constant force of compression is applied by the inner surface 224 of the dome bubble member 208 onto the annular sealing member 308 in each angular position of the imaging unit 8 about the first axis 332.

The imaging unit 8 may be fully rotatable (i.e. forming a 360 degree arc) about the first axis 332.

According to various example embodiments, as the imaging unit 8 is rotated about the second axis 348 to different angular positions about the second axis 348, the second axis 348 is also displaced in a direction transverse to itself, such as in a direction perpendicular to itself. The rotation of the imaging unit 8 about the second axis 348 and displacement of the second axis 348 occur in combination. That is, for each angular position of the imaging unit 8 about the second axis 348, the second axis 348 is displaced to a predetermined position corresponding to that angular position. Furthermore, in each combination of angular position of the imaging unit 8 about the second axis 348 and the displaced position of the second axis 348 corresponding to that angular position, the front end 112 of the imaging unit 8 maintains a substantially constant distance between itself and the inner surface 224 of the dome bubble member 208. For example, a center of the lens unit 12 and the radiating surface of the heat-emitting element 120 each maintain a respective substantially constant distance with the inner surface 224 of the dome bubble member 208 for each combination of angular position of the imaging unit 8 about the second axis 348 and displaced position of the second axis 348 corresponding to that angular position.

In various example embodiments, for each angular position of the imaging unit 8 about the second axis 348, the second axis 348 is displaced to maintain a constant distance between itself and a point along the inner surface 224 of the dome bubble member 208 corresponding to an intersection of the axis of the imaging unit 8 for the current angular position with the inner surface 224 of the dome bubble member 208.

According to various example embodiments wherein the annular sealing member 308 is provided, a substantially constant force of compression is applied by the inner surface 224 of the dome bubble member 208 onto the annular sealing member 308 for each combination of angular position of the imaging unit 8 about the second axis 348 and the displaced position of the second axis 348 corresponding to that angular position.

It will be appreciated that for each given angular position about the first axis 332, a great arc of the inner surface 224 of the dome bubble member 208 corresponding to the angular position can be defined as the bisection of the inner surface 224 of the dome bubble member 208 with a plane that contains the first axis 332 and an axis corresponding to the given angular position. It will be appreciated that for the given angular position about the first axis 332, the imaging unit 8 can be rotated about the second axis 348 within the plane of the great arc in combination with a displacement of the second axis 348 in a direction parallel to the plane. Accordingly, the rotation of the imaging unit about the second axis 348 combined with the displacement of the second axis 348 causes the front end 112 of the imaging unit to be displaced along a displacement path 356 that is substantially concentric with the great arc of the inner surface 224 of the dome bubble member 208.

It will be appreciated that due to the second axis 348 being offset from the center of the dome bubble member 208, rotation of the imaging unit 208 about the second axis 348 without displacement of the second axis 348 would otherwise cause the outer portion of the imaging unit 8 to define a displacement path that is not concentric with the dome bubble member 208 and the distance between the outer portion of the imaging unit 8 with the inner surface 224 of the dome bubble member 208 will not be constant during the rotation. By contrast, an appropriate combination of the rotation of the imaging unit 8 with displacement of the second axis 348 allows the displacement path 356 of the outer portion of the imaging unit 8 to be concentric with the inner surface 224 of the dome bubble member 208.

More particularly, as the imaging unit 8 is rotated about the second axis 348 from a first angular position to a second angular position, the distance between the outer portion of the imaging unit 8 and the inner surface 216 of the dome bubble member 208 will be altered (if there is no displacement of the second axis). The displacement of the second axis 348 in combination with the rotation compensates for this so that a constant distance is maintained between the outer portion of the imaging unit 8 and the inner surface 224 between any two angular positions about the second axis 348. The displacement of the second axis 348 is such that for each combination of angular position of the imaging unit 8 about the second axis 348 and displaced position of the second axis 348, a constant distance is maintained between the second axis 348 and the inner surface 224 of the dome bubble member 208 along the axis of the current orientation of the imaging unit 8.

The displacement of the second axis 348 for maintaining a constant distance between the outer portion of the imaging unit 8 and the inner surface 216 of the dome bubble member 208 over the angular range of rotation of the imaging unit 8 defines a range of displacement of the second axis 348. According to some example embodiments, the entire range of the displacement of the second axis 348 is offset from the center of the dome bubble member 208. According to various exemplary embodiments, the range of the displacement of the second axis 348 consist essentially of a translational displacement.

The operational unit 1 or alternative operational unit 1' according to various example embodiments described herein include a support member 364. The support member 364 is adapted to be rotatably coupled to the stationary part. The imaging unit 8 is further rotatably and displaceably coupled to the support member 364.

This rotational coupling of the support member 364 to the stationary part defines the first axis 332 of the first rotational movement of the imaging unit 8 about the stationary part.

The imaging unit 8 is coupled to the support member 364 via a first pivotal coupling member 372. The imaging unit 8 is adapted to rotate about the coupling member 372, whereby the coupling member 372 defines the second axis 348 of rotation of the imaging unit 8 about the stationary part. The imaging unit 8 and the pivotal coupling member 372 is further adapted to be displaced in a direction transverse to the second axis 348, which defines the range of displacement of the second axis 348.

According to various example embodiments, and as illustrated, the support member 364 includes at least one upstanding bracket arm 380 that supports the imaging unit 8. For example, a pair of opposing upstanding bracket arms 380 are provided in the support member 364. The upstanding bracket arm 380 includes a first slot 388 that retains the first pivotal coupling member 372. The pivotal coupling member 372 can be pivoted within the first slot 388, which corresponds to the pivotal movement of the imaging unit about the second axis 348. The pivotal coupling member 372 can also be displaced within the first slot 388, which corresponds to the displacement of the second axis 348. The extension of the first slot 388 defines the range displacement of the second axis 348.

The pivotal coupling member 372 may be a member extending transversely from an outer surface of the imaging unit 8. For example, the pivotal coupling member 372 extends from the support ring 80 of the imaging unit 8. The pivotal coupling member 372 may be integrally formed with the support ring 80. A fastener may cooperate with the pivotal coupling member 372 to further secure the pivotal coupling member 372 within the first slot 388. Alternatively, the fastener may form the pivotal coupling member 372.

According to various example embodiments, and as illustrated, the upstanding bracket arm 380 that supports the imaging unit 8 further includes a second slot 396 that retains a second coupling member 404 of the imaging unit 8. The second slot 396 engages the second coupling member 404 at a different location than the location of the engagement of the first pivotal coupling member 372 with the first slot 388. The second coupling member 404 may also be a member extending transversely from an outer surface of the imaging unit 8. For example, the second coupling member 404 extends from the support ring 80 of the imaging unit 8. The second coupling member 404 may also be integrally formed with the support ring 80. A fastener may cooperate with the second coupling member 404 to further secure the second coupling member 404 within the second slot 396. Alternatively, the fastener may form the second coupling member 404.

According to various example embodiments, the support ring 80 of the imaging unit 8 includes at least one coupling arm 408 that extends longitudinally from an outer surface of the support ring 8. The first pivotal coupling member 372 may extend transversely from a first location of the coupling arm 408. The second pivotal coupling member 404 may extend transversely from a second location of the coupling arm 408 remote of the first location.

The second slot 396 operates in combination with the first slot 388 to define the exact movement of the imaging unit 8. In particular, the second slot 396 defines the displacement of the second coupling member 404 such that for each given angular position of the imaging unit 8 about the first coupling member 372 (also the second axis 348), the first coupling member 372 is displaced to a unique position within the first slot 388 (also the range of displacement) corresponding to that angular position. Similarly, the second coupling member 404 is also displaced to a unique position within the second slot 396. Accordingly, the front end 112 of the imaging unit 8 is also displaced to a unique position corresponding to the given angular position of the imaging unit 8. Furthermore, the outer portion of the imaging unit 8 can be displaced to a series of positions (i.e. a series of points) corresponding to a series of angular positions of the imaging unit about the first coupling member 364, these positions together defining a displacement path of the imaging unit 8 about the first coupling member 364 that maintains a constant distance from the inner surface 224 of the dome bubble member 208. Where the dome bubble member 208 is spherical, the displacement path of the imaging unit 8 is concentric with the dome bubble member 208.

Referring back to FIG. 4, it will be appreciated that according to one example embodiment, the first slot 388 is substantially linear and defines the substantially linear (i.e. translational) displacement of the first coupling member 364 (the second axis 348 is also displaced). Accordingly, the second slot 396 is substantially curved in order to define the desired displacement path of the outer portion of the imaging unit 8.

Within a plane defined by the angular position of the imaging unit 8 about the first axis 332, the imaging unit 8 can be pivoted within a range of angular positions (e.g. tilt positions) that is defined by a minimum tilt angle and a maximum tilt angle. The minimum tilt may be represented by a first point along the circumference of the inner surface 224 of the dome bubble member 208 (i.e. first angular position about the center of the dome bubble member 208). The maximum tilt may be represented by a second point along the circumference of the inner surface 224 of the dome bubble member 208 (i.e. second angular position about the center of the dome bubble member 208). The minimum tilt angle and the maximum tilt angle and the center of the circle define together a circular sector of the given plane of the spherical dome bubble member 208.

In some example embodiments, the range of displacement of the second axis 348 is wholly located within the circular sector defining the range of motion of the imaging unit 8 relative to the center of the dome bubble member 208.

In some example embodiments, the first slot 388 is wholly located within the circular sector. Accordingly, the second slot 396 is concave with respect to the linear first slot 388.

It will be appreciated that the locating of the range of displacement of the second axis 348 wholly within the circular sector defining the range of motion of the imaging unit 8 relative to center of the dome bubble member 208 reduces the space taken up by the imaging unit 8 within the camera chamber 216 compared to locating the second axis 348 at the center of the spherical dome bubble member 208. This reduction of space impact may be a factor when designing a domed camera device wherein the space within the camera chamber 216 may be restricted.

Figure 8A:
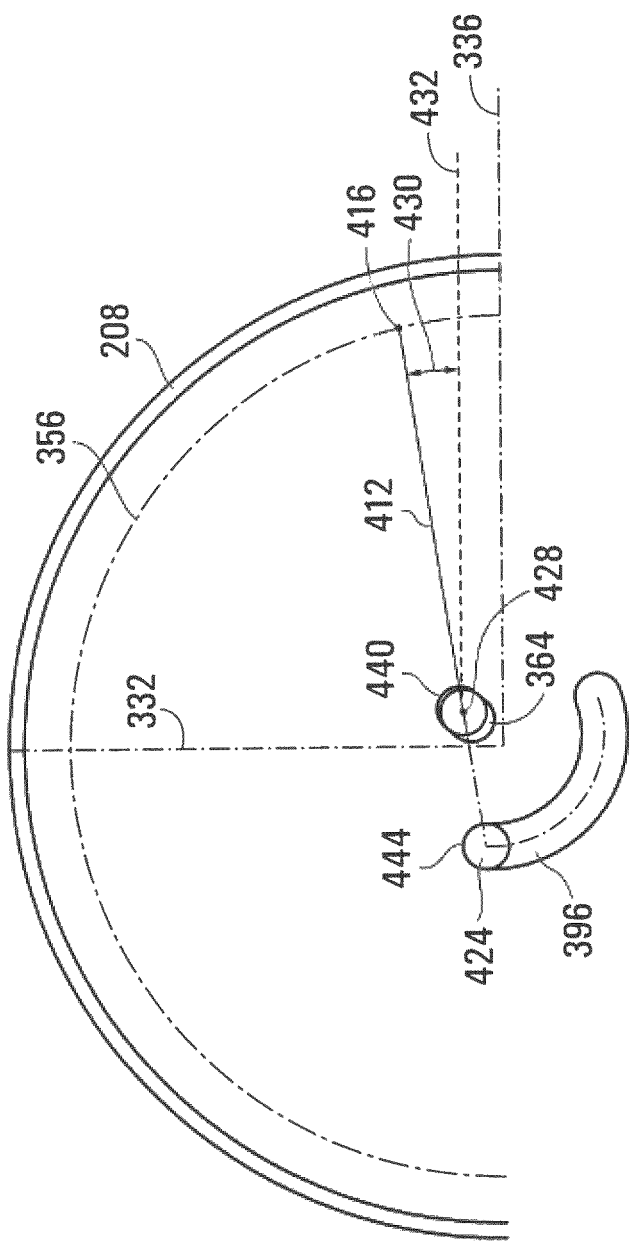
FIG. 8A illustrates a schematic diagram representing a minimum tilt angle of an imaging unit about a second axis according to one example embodiment.

Referring now to FIG. 8A, therein illustrated is a schematic diagram representing a minimum tilt angle of the imaging unit 8 about the second axis 348. The representative axis 412 represents the axis of the imaging unit 8. A distal end 416 of the representative axis 412 represents the front end 112 of the imaging unit 8. A proximal end 424 of the representative axis 412 represents the second coupling member 404 of the imaging unit 8 retained within the second slot 396. A coupling point 428 that is intermediate the distal end 416 and proximal end 424 represents the first pivotal coupling member 372 of the imaging unit 8 retained within the first slot 388. It will be appreciated that the coupling point 428 represents the second axis 348.

At the minimum tilt angular position of the imaging unit 8, the imaging unit 8 is rotated to a tilt angular position about the second axis 348 that is at or near being horizontal. That is, the tilt angular position is parallel or close to being parallel with the plane 336 defined by the bottom lip 340. For example, the tilt angular position of the imaging unit 8 forms an angle 430 of at most 10 degrees with a line 432 that is parallel to the plane 336 and collinear to the current position of the second axis 348. Due to the second axis 348 being offset from the center of the dome bubble member 208, the representative line 432 is spaced apart from the plane 336.

According to some example embodiments, the tilt angular position of the imaging unit 8 forms an angle 430 of between approximately 3 degrees and approximately 7 degrees with a line 432 that is parallel to the plane 336 and collinear to the current position of the second axis 348.

According to some example embodiments, the tilt angular position of the imaging unit 8 forms an angle 430 of approximately 5 degrees with a line 432 that is parallel to the plane 336 and collinear to the current position of the second axis 348.

It will be appreciated that in the minimum tilt angular position, and due to the chosen position of the first slot 388, the coupling point 428 representing the first pivotal coupling member 372 is displaced to a position near an upper end 440 of the first slot 388 and a proximal end 424 representing the second coupling member 404 is displaced to a position near an upper end 444 of the second slot 396. This is the combination of angular position about the second axis 432 and its corresponding displaced position of the second axis 432 that allows the front end 112 of the imaging unit 8 to be at the constant distance from the inner surface 224 of the dome bubble member 208 when in the minimum tilt angle position.

Figure 8B:
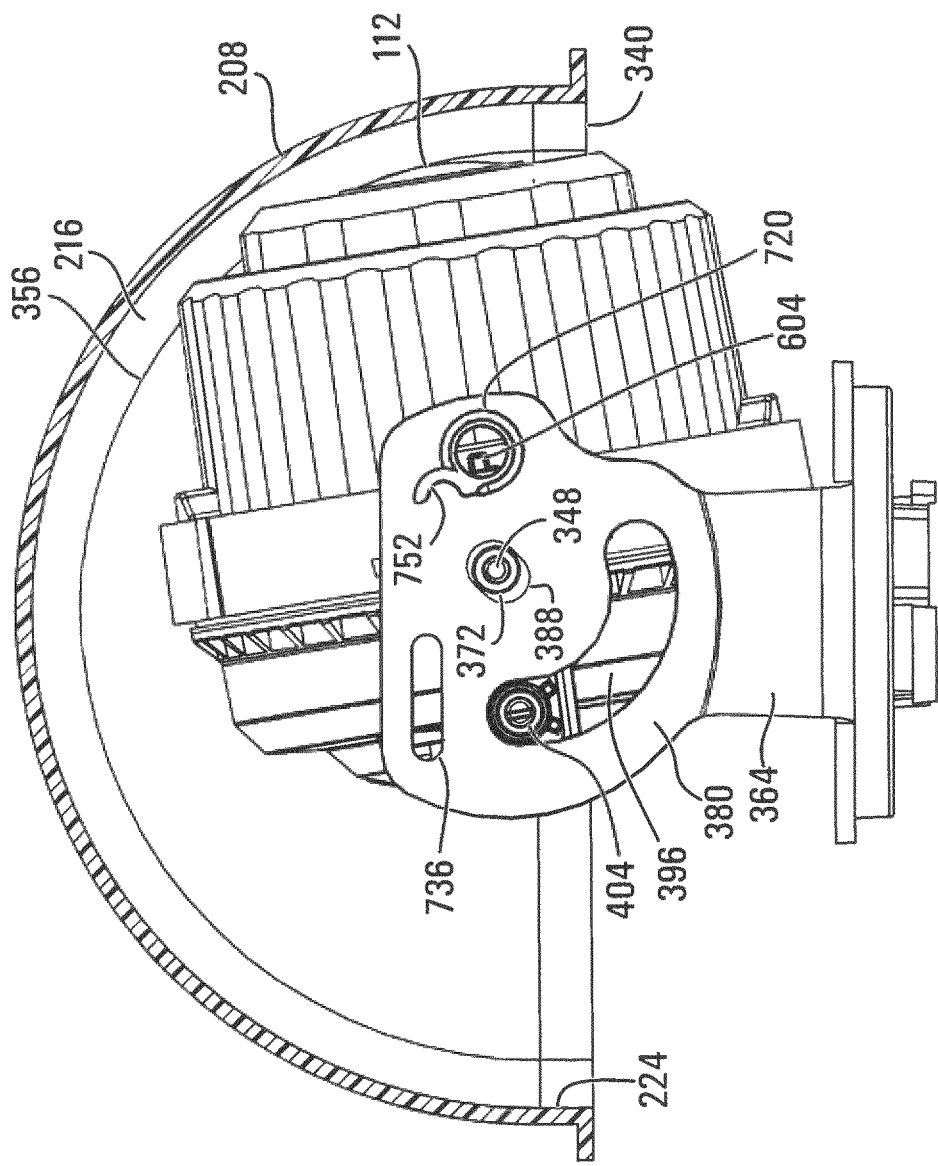
FIG. 8B illustrates a side elevation view of the imaging unit positioned at its minimum tilt angle about the second axis according to one example embodiment.

FIG. 8B illustrates a side elevation view of the imaging unit 8 positioned at its minimum tilt angle about the second axis 432.

Figure 9:
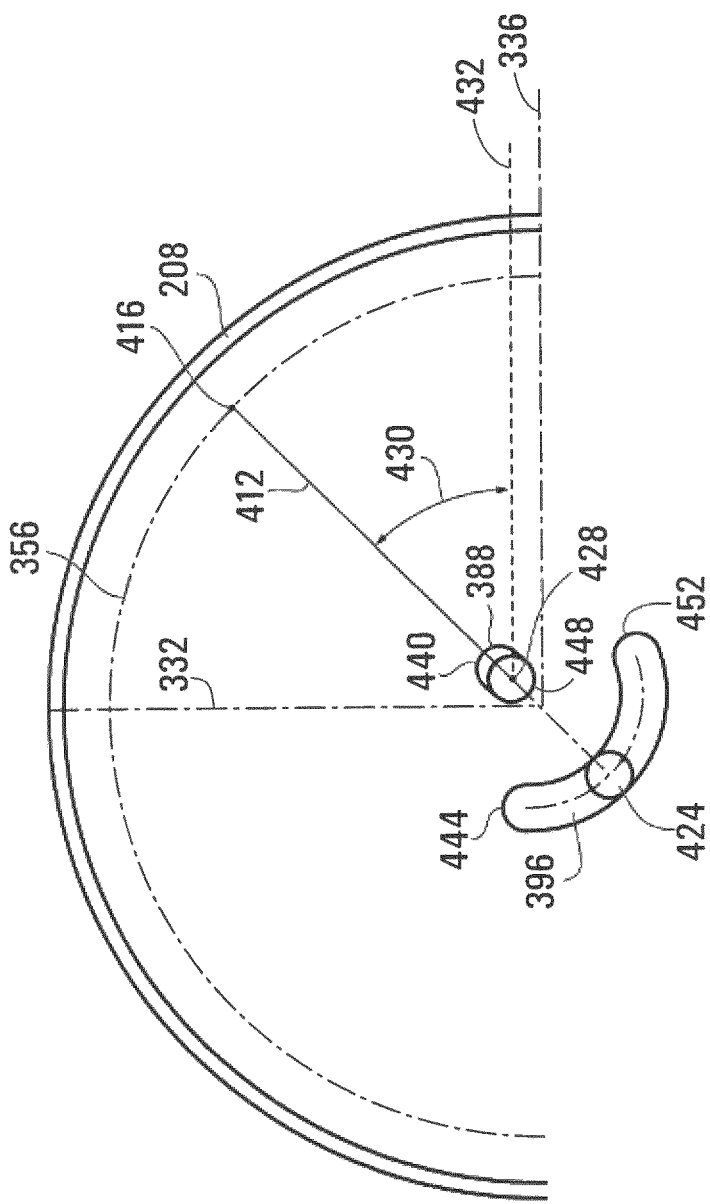
FIG. 9 illustrates a schematic diagram representing an intermediate tilt angular position of the imaging unit about the second axis according to one example embodiment.

Referring now to FIG. 9, therein illustrated is a schematic diagram representing an intermediate tilt angular position of the imaging unit 8 about the second axis 348. The situation represented in FIG. 9 may correspond to the angular position of the imaging unit 8 as illustrated in FIG. 4. In this intermediate angular position, the coupling point 428 representing the first pivotal coupling member 372 is displaced to a position at or in proximity of the lower end 448 of the first slot 388 and a proximal end 424 representing the second coupling member 404 is displaced to a position intermediate the upper end 444 and the bottom end 452 of the second slot 396.

Figure 10A:
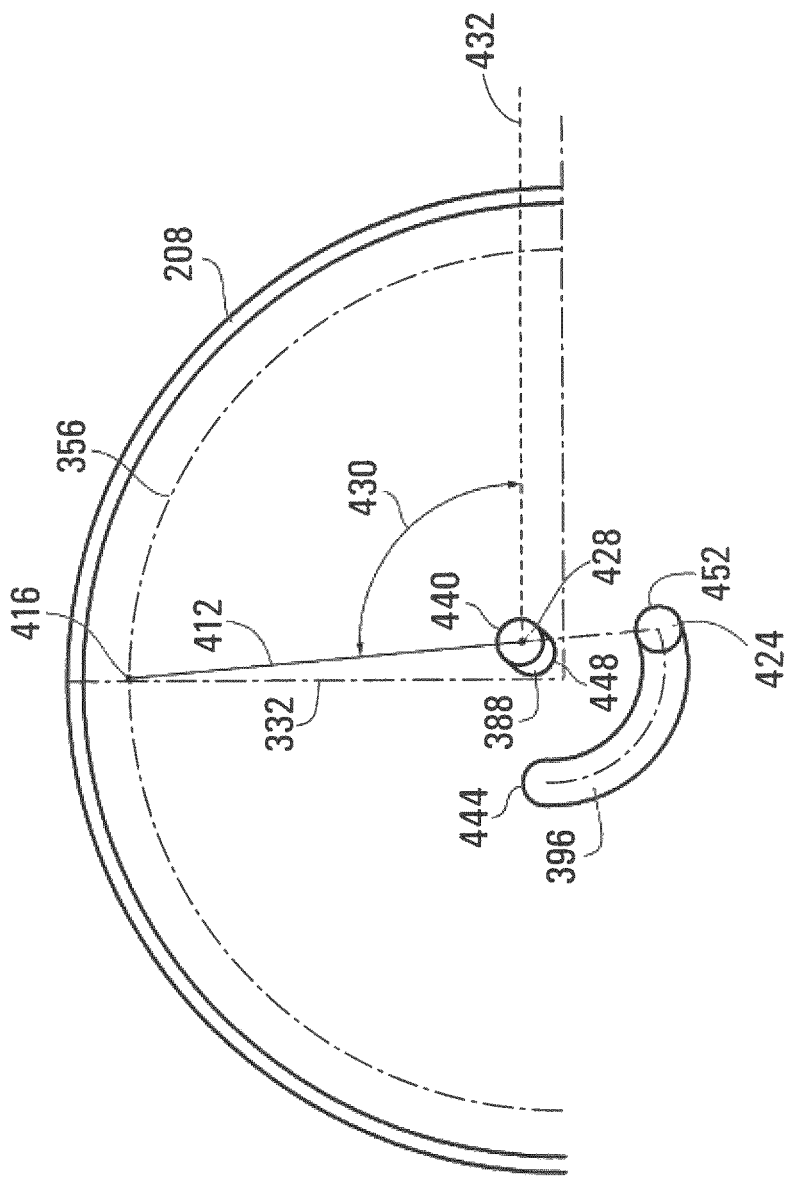
FIG. 10A illustrates a schematic diagram representing a maximum tilt angular position of the imaging unit about the second axis according to one example embodiment.

Referring now to FIG. 10A, therein illustrated is a schematic diagram representing a maximum tilt angular position of the imaging unit 8 about the second axis 348. In this maximum tilt angular position, the imaging unit 8 is rotated to a tilt angular position about the second axis 348 that is at or near being vertical. That is, the tilt angular position is parallel or close to being parallel with the first axis 332. In some examples, the maximum tilt angular position of the imaging unit 8 is a position that is past the vertical (as represented by the first axis 332). In some examples, it may be required to tilt the imaging unit 8 past the vertical due to the second axis 348 being offset from the center. For example, and as illustrated, angle 430 is greater than 90 degrees. This tilting past the vertical allows the imaging unit 8 to cover a circular sector defined by a maximum angular position corresponding to the first axis 332 extending from the center of the dome bubble member 208.

FIG. 10B illustrates a side elevation view of the imaging unit 8 positioned at its maximum tilt angle about the second axis 432.

According to various example embodiments for choosing the range of displacement of the first pivotal coupling member 372 within the first slot 388 and the range of displacement of the second coupling member 404 within the second slot 396, a desired displacement path of the front end 112 of the imaging unit 8 is first defined. A space within the plane corresponding to a given angular position of the imaging unit 8 about the first axis 332 that may be allocated to the imaging unit 8 for rotating about a second axis 348 is then defined. The range of displacement of the second axis 348 for a given location of the first pivotal coupling member 372 along the imaging unit 8 that will achieve the desired range of rotation of the imaging unit 8 about the second axis 348 within the defined space is determined. This range of displacement further defines the length and orientation of the first slot 388. For each of a series of points along the desired displacement path of the front end 112, a combination of the angular position of the imaging unit 8 about the second axis 348 and the position of the second axis 348 within its range of displacement for achieving the point along the displacement path is determined. For each point, the position of the second coupling point 404 corresponding to the combination of the angular position and position of the second axis 348 is determined. The plurality of positions determined for the coupling point 428 may be then used to define the range of displacement of the coupling point 428, which corresponds to the shape of the second slot 396.

Referring back to FIG. 3, according to some example embodiments, the imaging unit 8 includes a thermally conductive spreader member 500 housed within the imaging body 48 of the imaging unit 8. A first portion of the thermally conductive spreader member 500 is in thermal contact with the image sensor 14. A thermally conductive material, such as thermally conductive paste may be provided between the image sensor 14 and the spreader member 500 to conduct heat from the image sensor 14. A second portion of the thermally conductive spreader member 500 is in thermal contact with a thermally conductive portion of the imaging unit. The thermally conductive portion of the imaging unit 8 includes a portion of the outer surface of the imaging unit 8. Accordingly, heat generated at the image sensor 14 is transmitted via the spreader member 500 to the thermally conductive portion of the imaging unit 8. Heat received at the thermally conductive portion of the imaging unit 8 is further dissipated from the outer surface of the imaging unit 8 to the environment surrounding and outside of the imaging unit 8.

According to various example embodiments, and as described elsewhere herein, the imaging unit 8 has a substantially cylindrical body 48 that includes front sidewalls 56 and rear sidewalls 64. The front sidewalls 56 may be annular and thermally conductive. That is, the front sidewalls 56 may correspond to the thermally conductive portion of the annular sidewall of the cylindrical imaging body 48. In some example embodiments, the thermally conductive portion of the annular sidewall of the cylindrical imaging body 48 may include the lens cowling of the imaging unit 8.

The spreader member 500 may have a substantially planar body 516 and a plurality of arms 524 extending from the planar body 516. For example, and as illustrated in FIG. 3, the spreader member 500 is positioned rearwardly of the image sensor 14 (i.e. on the other side of the image sensor 14 relative to the front end 112 of the imaging unit 8). The spreader member 500 may also be positioned rearwardly of the circuitry 15 associated to the image sensor 14. Each of the image sensor 14, circuitry 15 and planar body 516 may be oriented perpendicular to a longitudinal axis 532 of the imaging unit 8. The planar body 516 may be in thermal contact with the image sensor 14 via the circuitry 15 and a thermally conductive material 540.

A plurality of arms 524 of the spreader member 500 extend axially from the planar body 516. For example, and as illustrated, the plurality of arms 524 each extend in the forward direction of the imaging unit 8 past the image sensor 14 to contact the thermally conductive portion of the annular sidewall of imaging unit 8. For example, and as illustrated in FIG. 3B, the plurality of arms 524 contact the front sidewalls 56. The spreader member 500 may each have a radially extending flange member 548 which extends radially from the front end of each arm 524 and which contacts a rearward end of the front sidewalls 56.

According to various example embodiments, the front sidewalls 56, corresponding to a forward portion of the annular sidewalls of the imaging unit 8, are formed of a thermally conductive material and the rear sidewalls 64, corresponding to a rearward portion of the annular sidewalls of the imaging unit 8, are formed of a thermally insulating material. Furthermore, the image sensor 14 is positioned at a central-rearward position relative to sidewalls of the imaging body 48. Accordingly, heat is generally dissipated from a forward portion of the imaging unit 8. It will be appreciated that the forward portion of the imaging unit 8 will generally be located closer to the dome bubble member 208. Therefore, heat dissipated from the imaging unit 8 will more easily radiate to the dome bubble member 208 and/or to the environment surrounding the dome bubble member 208.

By contrast, the rearward portion of the imaging unit 8 will typically be located closer to the base member 32 and the stationary part of the camera device 1. It will be appreciated that these portions of the camera device 1 are more thermally insulating than the dome bubble member 208 and heat dissipated from the rearward portion does not as effectively contribute to reducing heat within the camera device 1.

According to various example embodiments, the planar body portion 516 of the spreader member 500 is integrally formed with its plurality of arm members 524. For example, the spreader member 500 may be formed of a material chosen from aluminum, steel and magnesium.

Figure 11:
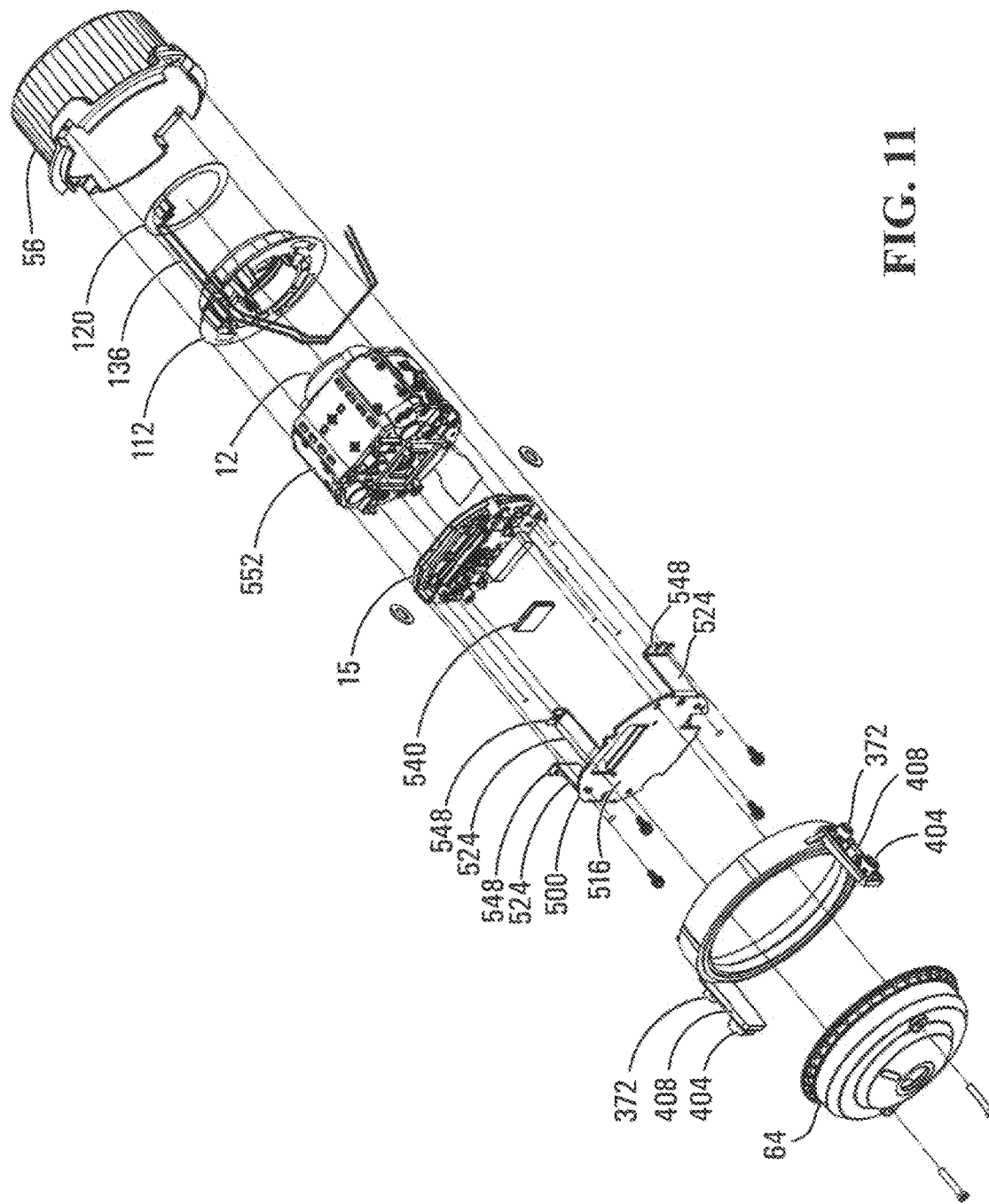
FIG. 11 illustrates an exploded view of the imaging unit according to one example embodiment.

Referring now to FIG. 11, therein illustrated is an exploded view of the imaging unit 8 according to various example embodiments. Each of the front sidewalls 56, image capture unit 548, support ring 80, spreader member 500 and rear sidewalls 64 are axially aligned. As described elsewhere herein, the front sidewalls 56 and the rear sidewalls 64 are cooperatively coupled to define the imaging sub-chamber of the imaging body 48, which houses the image capture unit 552 and the spreader member 500. The support ring 80 surrounds the imaging unit 8 so that the imaging unit 8 may be rotatable within the support ring 80. The image capture unit 552 includes components of the imaging unit for capturing images of a scene, such components including the lens unit 12, imaging sensor 14, circuitry 15 and one or more motors. The one or more motors may include a focus motor, zoom motor, iris motor and/or IR filter motor.

Within the camera chamber 16, the planar body 516 may be fastened to a rear portion of the optical unit 548. For example, the planar body 516 may be fastened to the circuitry 15 of the optical unit 548. Furthermore, the radially extending flange members 548 may be fastened to the rearward end of the front sidewalls 56.

Figure 12:
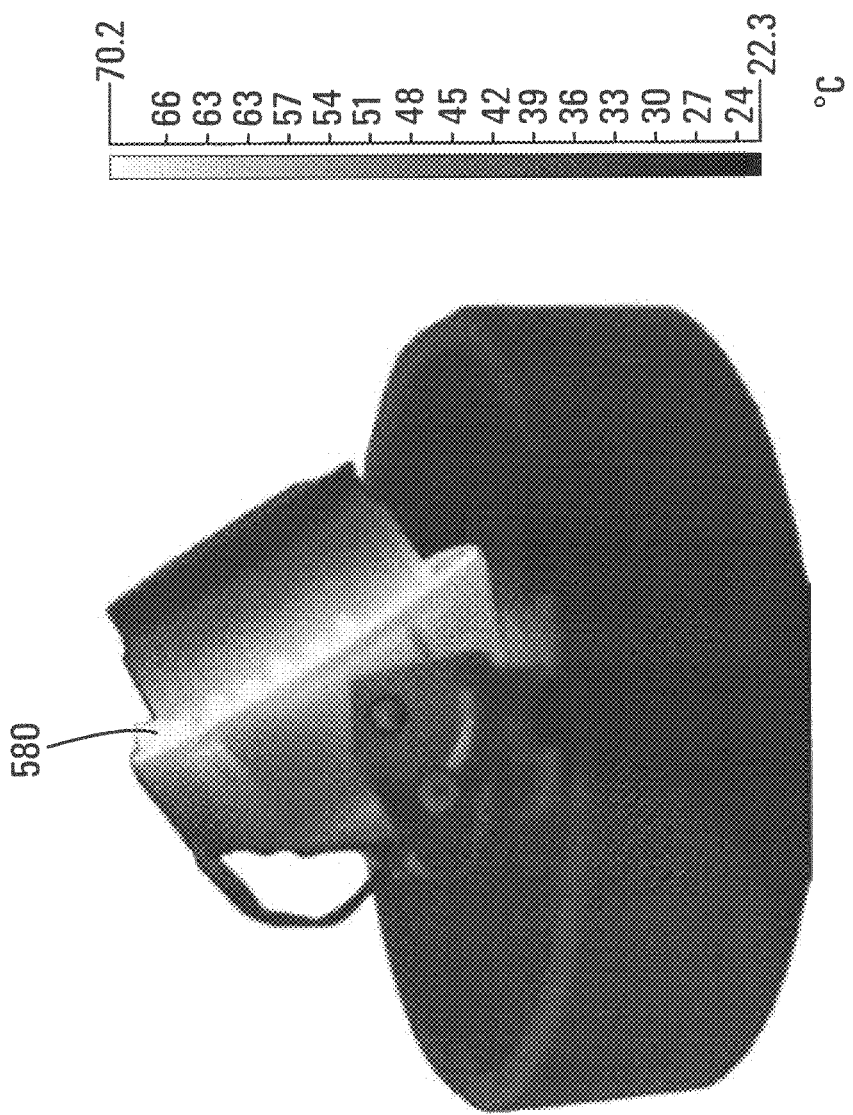
FIG. 12 illustrates a heat map of an operational unit without a spreader member according to a first example embodiment.
Figure 13:
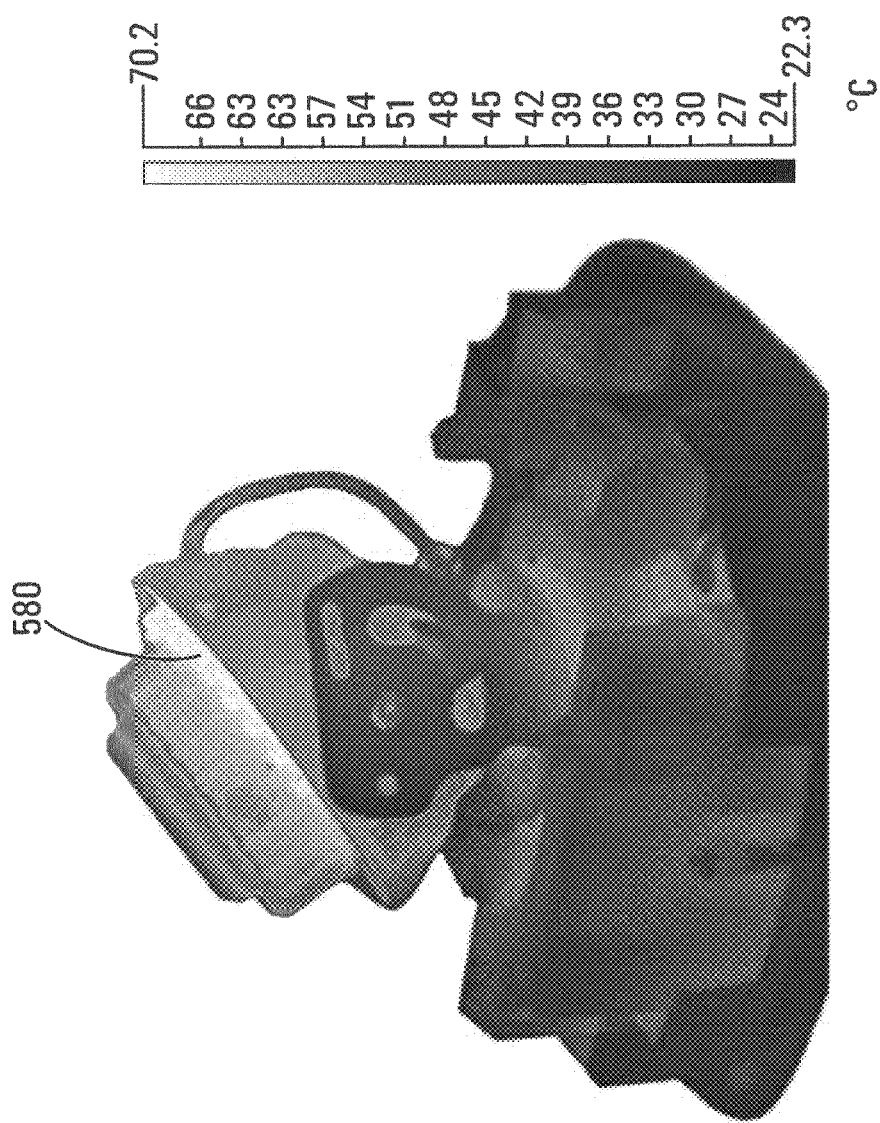
FIG. 13 illustrates a heat map of an operational unit with a spreader member according to a second example embodiment.

FIGS. 12 and 13 are thermal photographic images of heat maps of an example operational unit without the spreader member 500 and an example operational unit with the spreader member 500, respectively. It will be appreciated that an intermediate portion 580 of the imaging unit 8 of the operational unit 1 without the spreader member 500 (shown in FIG. 12) exhibits significantly higher temperatures than a corresponding intermediate portion 588 of the imaging unit 8 of the operational unit 1 with the spreader member 500 (shown in FIG. 13). It will be further appreciated that this intermediate portion 580 corresponds to where the image sensor 14 of the imaging unit 8 would be located.

It will be appreciated that lowering the temperature of the image sensor 14 or of the space surrounding it can improve the performance of the image sensor 14. For example, a lower operating temperature or surrounding temperature of the image sensor 14 may reduce the noise in the images captured by the image sensor 14. Additionally or alternatively, lowering the temperature of the image sensor or the surrounding temperature of the image sensor 14 may expand the upper limit of the ambient environment operating temperature for the camera device.

According to various example embodiments, and as described elsewhere herein, the shroud layer of the camera device 1 may be formed of a material that is transmissive to light having wavelengths within at least a portion of the infra-red range. Accordingly, the shroud layer allows transmission through it of heat dissipated from the outer surface of the thermally conductive portion of the imaging unit 8. For example, heat dissipated from the imaging unit 8 that have wavelengths in the infra-red range is transmitted through the infra-red transmissive shroud layer to reach the inner surface 224 of the dome bubble member. This further dissipated heat may heat the dome bubble member 208. Accordingly, the spreader member 500, the thermally conductive sidewall of the imaging unit 8 and the thermally conductive shroud layer operate in combination to promote dissipation of heat from the image sensor 14. This combined operation may also promote heating of the dome bubble member 208.

Furthermore, where an annular sealing member 308 is provided, the sealing member 308 restricts flow of heat from the heat-emitting element 120 to other parts of the imaging unit 8, which would otherwise cause of heating of the image sensor 14.

According to various example embodiments, the shroud member 600 is formed of an infra-red transmissive material. That is, the shroud member 600 is substantially transparent to infra-red light having wavelengths within at least a portion of the infra-red range and does not absorb any energy from light having these wavelengths in the infra-red range.

Figure 14:
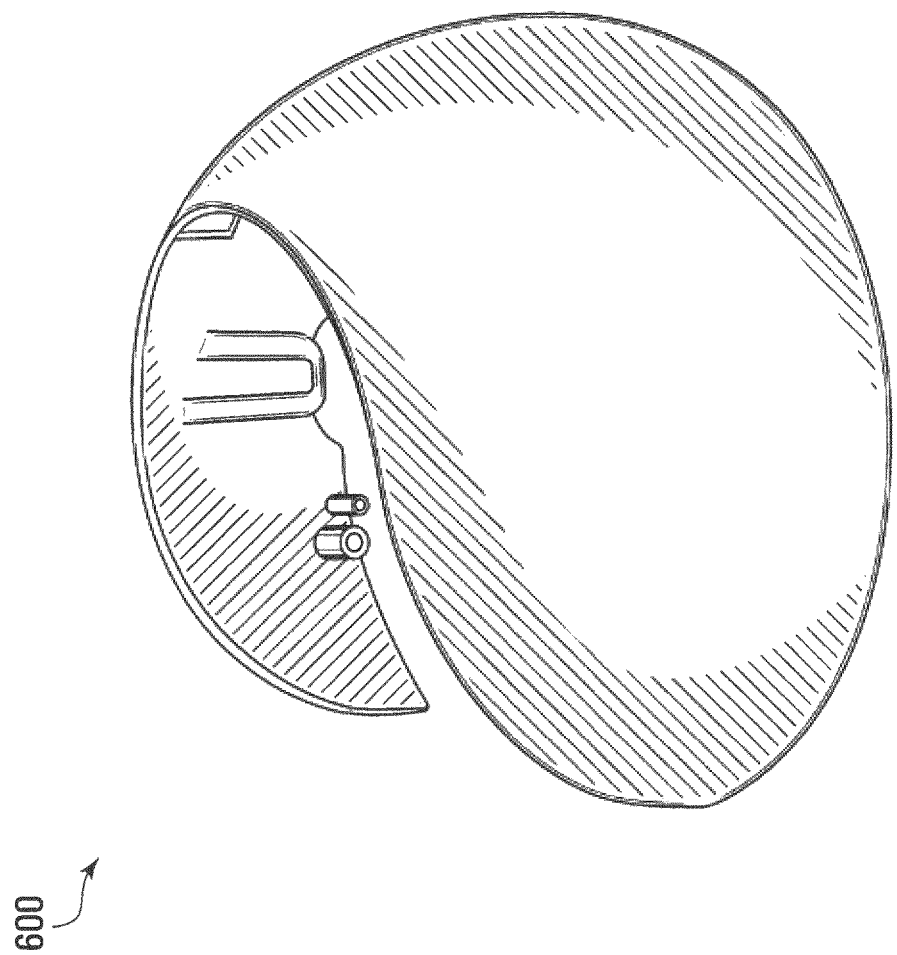
FIG. 14 is a perspective view of a shroud member according to one example embodiment exposed to visible light.

FIG. 14 shows an example shroud member 600 that may be substantially opaque to visible light. For example, the shroud layer may be formed of a resinous material, such as plastic resin. In such a case, it will be appreciated that, due to the infra-red transmissive nature of the shroud member 600, no infra-red light will be reflected or absorbed by the shroud member 600. By contrast, the shroud member 600 will appear to be substantially opaque in visible light. It will be appreciated that the opaque property of the shroud member 600 allows it to visually conceal elements positioned beneath it when viewed with the naked eye.

Figure 15:
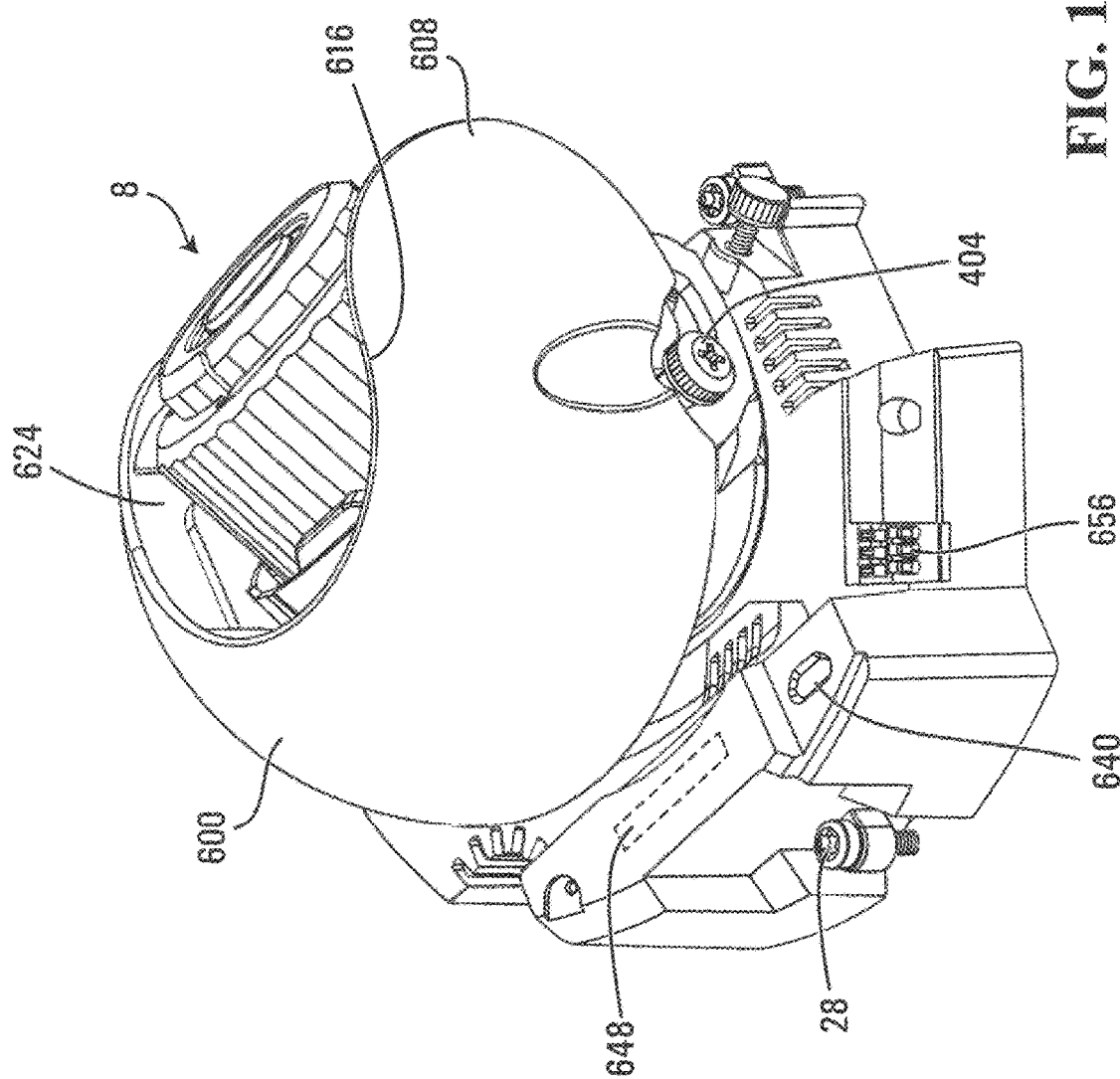
FIG. 15 illustrates a rear perspective view of an operation unit having a shroud member according to one example embodiment.

Referring now to FIG. 15, therein illustrated is rear perspective view of an operational unit 1 having a shroud member 600. The shroud member 600 is mounted on the movable part so that the shroud member 600 is pivotal about a pivot axis. The pivot axis may correspond to a third axis 604 of rotation. It will be understood that example embodiments wherein the shroud member 600 is pivotal about its pivot axis 604 is applicable to both example embodiments wherein the second axis 348 of rotation of the imaging unit 8 is stationary and example embodiments wherein the second axis 348 of rotation of the imaging unit 8 displaceable in a direction transverse to itself.

The third axis 604 may be perpendicular to the first axis 332 and substantially parallel to the second axis 348. For example, the third axis 604 may be parallel to the horizontal plane 336 defined by the bottom lip 340 of the dome bubble member 208.

The third axis 604 may be offset from the second axis 348. Accordingly, the imaging unit 8 rotates about a second axis 348 that is different from the third axis 604.

The shroud member 600 may be pivoted about the imaging unit 8 independently of the rotation of the imaging unit 8 about the second axis 348. For example, the imaging unit 8 can maintain a constant angular position about the second axis 348 as the shroud member 600 is pivoted about the third axis 604 within its range of pivoting. Similarly, the shroud member 600 can maintain a constant angular position about the third axis 604 as the imaging unit 8 is rotated about its second axis 348.

Since the shroud member 600 forms part of the movable part of the operational unit 1, it is moved with movement of the movable part. According to various example embodiments, the shroud member 600 maintains an angular alignment with the imaging unit 8 about the first axis 332 as the movable part is rotated about the first axis 332. That is, a given angular reference point of the imaging unit 8 will maintain a constant angular distance about the first axis 332 relative to a given angular reference point of the shroud member 600. For example, a longitudinal axis of the imaging unit 8 maintains angular alignment with a cutaway portion 616 of the shroud member 600 as the movable part is rotated about the first axis 332.

Continuing with FIG. 15, the shroud member 600 includes a dome-shaped body 608. The dome-shaped body 608 defines a domed sub-chamber 624 that corresponds to the space contained within the concave portion of the dome-shaped body 608. The dome-shaped body 608 further defines a cutaway portion 616 which corresponds to an open portion along an arc of the dome-shaped body 608.

Figure 16:
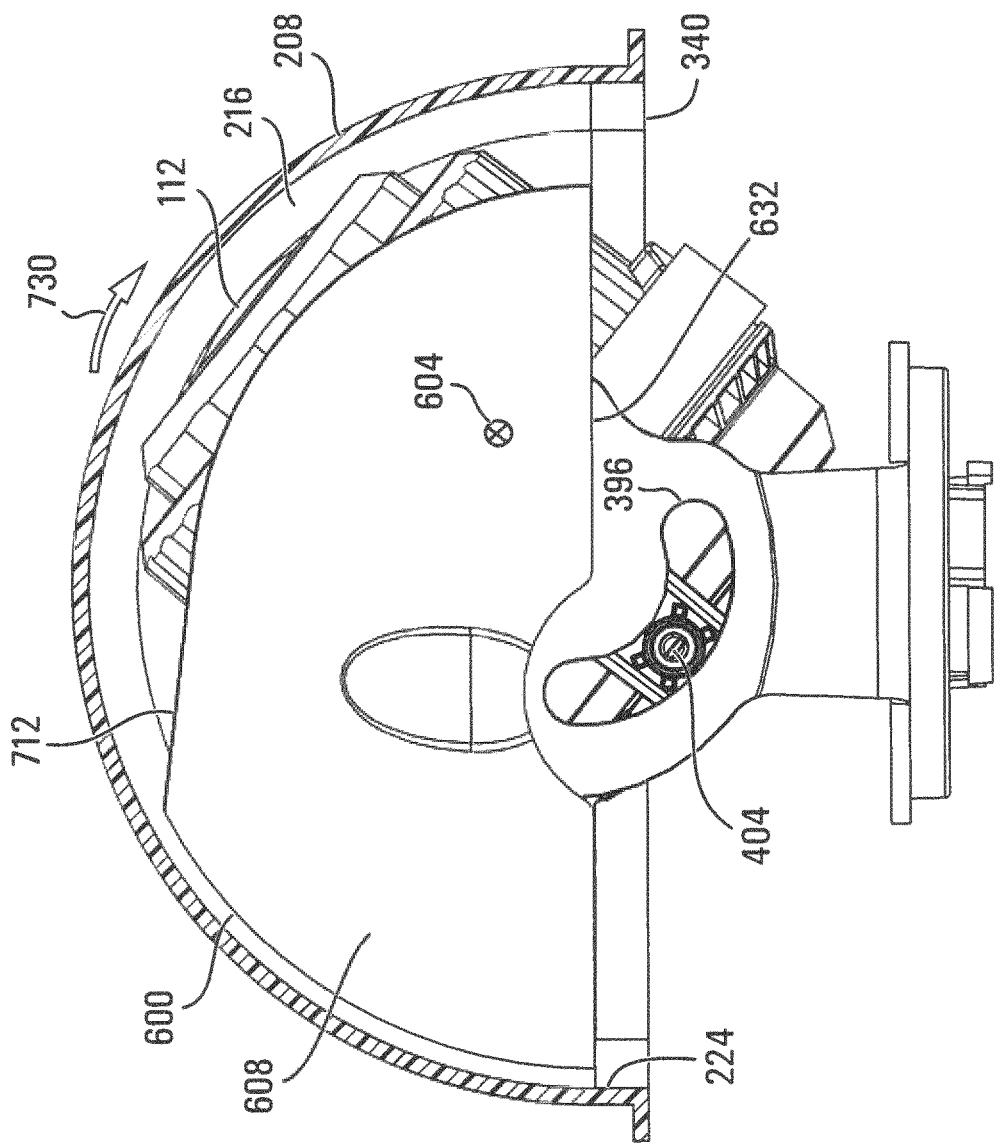
FIG. 16 illustrates a side elevation view of the imaging unit positioned at an intermediate tilt angular position about the second axis according to one example embodiment.
Figure 17:
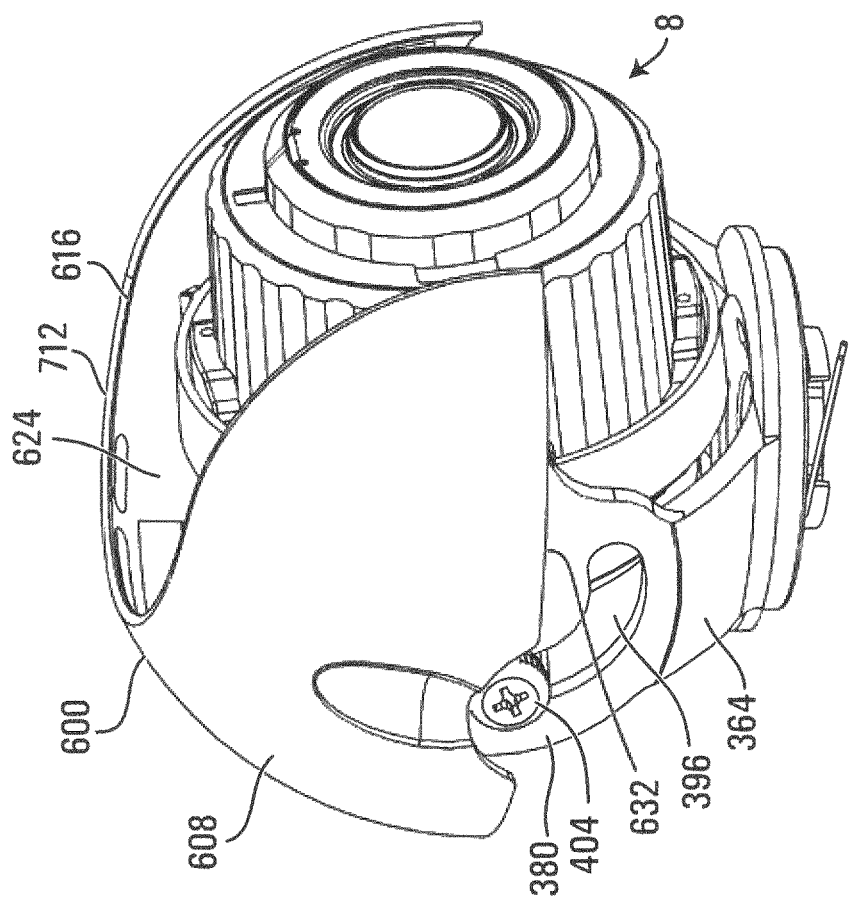
FIG. 17 illustrates a perspective view of an imaging unit according to one example embodiment having a shroud member positioned in a concealing position.

When the shroud member 600 is appropriately mounted within the movable part, the imaging unit 8 can be substantially housed within the domed sub-chamber 624 of the shroud member 600 (as illustrated in FIGS. 15 and 16). The imaging unit 8 is aligned angularly about the first axis 332 with the cutaway portion 616 of the shroud body 608. For example, the front end 112 of the imaging unit 8 is oriented towards the cutaway portion 616.

Referring now to FIG. 16, therein illustrated is a side elevation view of the operational unit 1 having a mounted shroud member 600. The mounted shroud member 600 defines a domed sub-chamber 624. It will be appreciated that a large portion of the imaging unit 8 is housed within the domed sub-chamber 624. In some example embodiments, a portion of the front end 112 of the imaging unit 8 may extend past an outer surface defined by the dome-shaped body 608 of the shroud member 600. That is, the imaging unit 8 is angularly aligned with the cutaway portion 616 and the front end 112 of the imaging unit 8 projects through the cutaway portion 616.

According to various example embodiments, a range of rotation of the imaging unit 8 about the second axis 348 substantially corresponds to an arc-wise length of the cutaway portion 616 of the dome-shaped body 608 of the shroud member 600. For example, and as illustrated, the cutaway portion 616 extends along a great arc that includes the first axis 332 over an arc having a length of approximately 90 degrees. The cutaway portion 616 starts at the bottom lip 632 of the shroud member 600 and extends to an approximately an apex 712 of the shroud member 600. In some example embodiments, the cutaway portion 616 may extend slightly past the apex 712 so as to accommodate the rotation of the imaging unit 8 about the second axis 348, such as in example embodiments where the maximum tilt angular position of the imaging unit 8 is a position that is past the vertical.

The shroud member 600 according to various example embodiments is detached from the dome bubble member 208. For example, the dome bubble member 208 can be removed from the camera device 8 while the shroud member 600 remains mounted to the movable part of the operational unit 1. Furthermore, when the shroud member 600 is appropriately coupled to the moving part, it is positioned so as to be spaced apart from the inner surface 224 of the dome bubble member 208.

The pivotal shroud member 600 according to various example embodiments can be pivoted between a concealing position and an installation position. FIGS. 15, 16, 17 and 19 show the pivotal shroud member 600 in a concealing position. In the concealing position, the imaging unit 8 is substantially housed within the domed sub-chamber 624 of the shroud member 600. Accordingly, the pivotal shroud member 600 at least partly conceals the imaging unit 8. For example, and as illustrated, the pivotal shroud member 600 has a substantially horizontal orientation wherein its bottom lip 632 is substantially parallel with the horizontal plane 336 defined by the bottom lip 340 of the dome bubble member 208. Accordingly, the shroud member 600 is substantially aligned with the dome bubble member 208 so that the dome bubble member 208 can be securely attached to the base member 32.

The arc defined by the cutaway portion 616 of the shroud member 600 when in its concealing position substantially corresponds to the displacement path of the front end 112 of the imaging unit 8 about its second axis 348.

Figure 19:
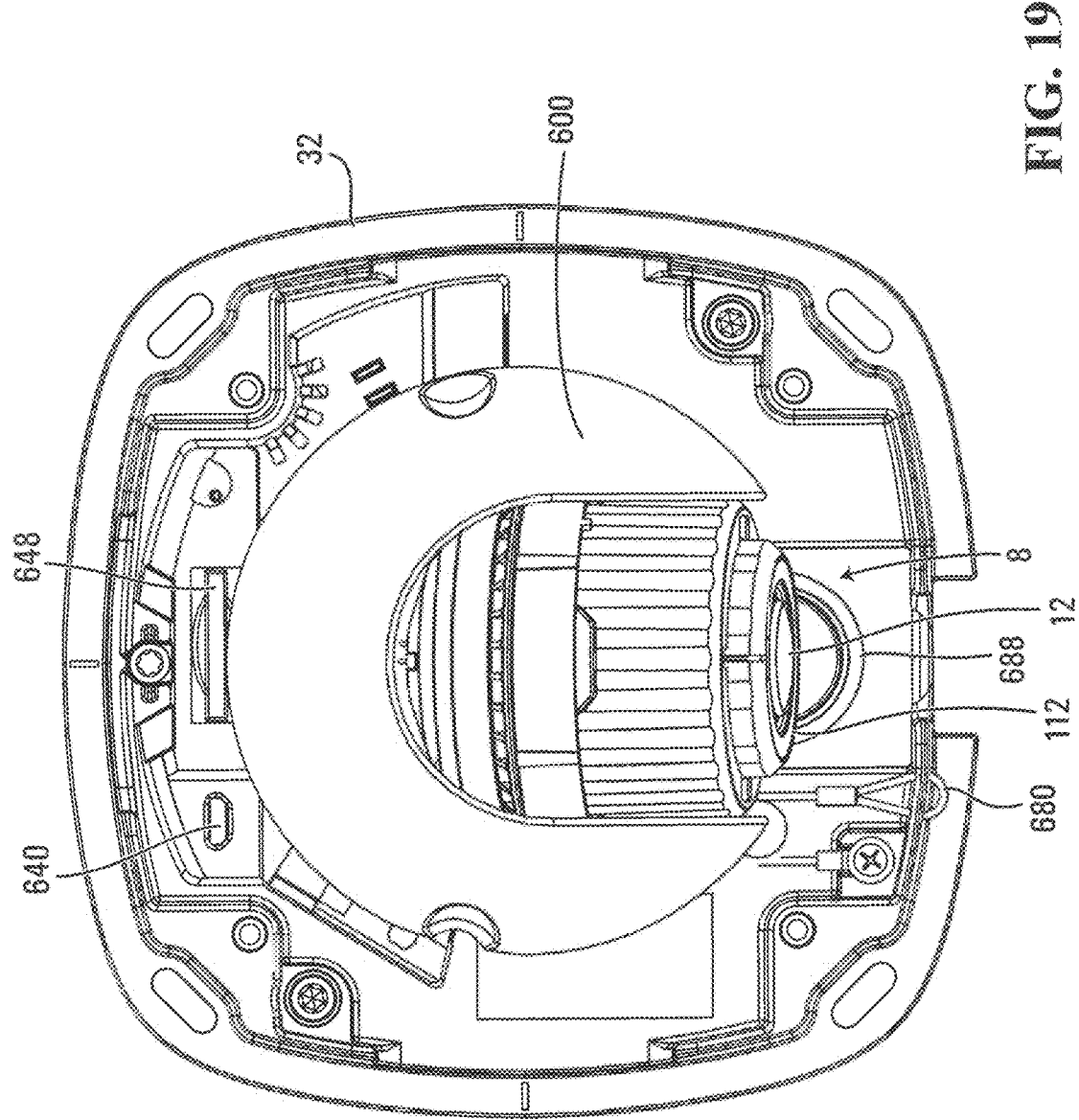
FIG. 19 illustrates a plan view of an operational unit according to one example embodiment having a shroud member positioned in a concealing position.

Referring now to FIG. 19, therein illustrated is a plan view of a camera device 8, with the dome bubble member 208 removed for illustration, in which the shroud member 600 is in its concealing position. Due to the horizontal orientation of the shroud member 600 while in this position, the shroud member 600 occupies a large portion of a horizontal cross-sectional area of the interior of the camera device 4. The horizontal cross-sectional area is defined within a plane that is perpendicular to the first axis 332. Accordingly, the shroud member 600 in its concealing position substantially obstructs access to elements located closer to the base member 32 within the camera chamber 216. It will be appreciated that due to the base member 32 being a contiguous member, some elements of the camera device 4 located within the camera chamber 216 are only accessible via a "downward" direction when the dome bubble member 208 is removed. The shroud member 600 obstructs access to some of these elements via the downward direction towards the base member 32.

It will be understood that the "downward" direction refers to a direction starting from an apex of the dome bubble member 208 when it is appropriately attached to the base member 32 towards the inner surface of the base member 32. It will be understood that in some examples the "downward" position may be inverted, such as when the camera device 4 is attached to a ceiling via the base member 32, but that the "downward" direction follows the orientation of the camera device 4 and continues to be defined as a direction towards the inner surface of the base member 32.

For example, various elements of the stationary part are located "below" the shroud member 600 in the "downward" direction. In particular, various connection ports of the stationary part are obstructed from access in the "downward" direction when the shroud member 600 is in the concealing position. These connection ports may include a data port 640 (e.g. illustrated as a micro-usb port but may be any other data port), a memory card slot 648 (e.g. illustrated as an SD card slot but may be any other data port), a network port 656 (e.g. illustrated as an ethernet port but may be any other data port), an input/output port 664, a power slot 672 and an audio/video connector 676. Other elements obstructed by the shroud member 600 in the concealing position include mechanical elements such as a lanyard 680 for attaching the dome bubble member 208 to the base member 32, grommet 688 for receiving a data cable, and fastener 696 for locking the movable part in a given angular position about the first axis 332 (i.e. pan position). It will be understood that while some elements may be visible in the plan view of FIG. 19, the close proximity of the circumference of the shroud member 600 with inner walls of the base member 32 contribute to obstructing the elements located below the shroud member 600.

According to various example embodiments, the movable part includes a locking mechanism for retaining the shroud member 600 in its concealing position. The locking mechanism is adapted to retain the shroud member 600 in the concealing position when the camera device 4 is oriented upside down (such as when secured to a ceiling). The locking mechanism is also adapted to retain the shroud member 600 in the concealing position when the camera device 4 is oriented sideways (such as when secured to a vertical wall). For example, the shroud member 600 may be only movable from its concealing position when a force is applied to the shroud member 600 or the locking mechanism is actuated.

Figure 18:
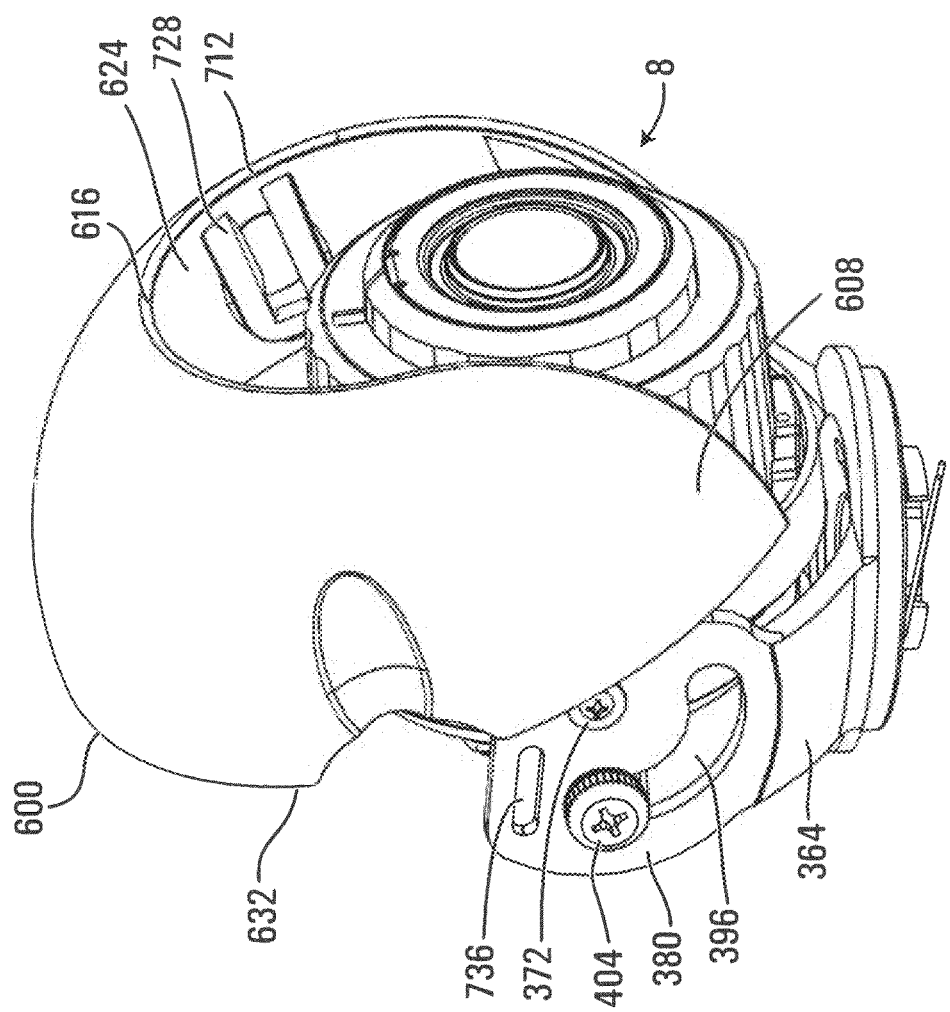
FIG. 18 illustrates a perspective view of an imaging unit according to one example embodiment having a shroud member positioned in an installation position.
Figure 20:
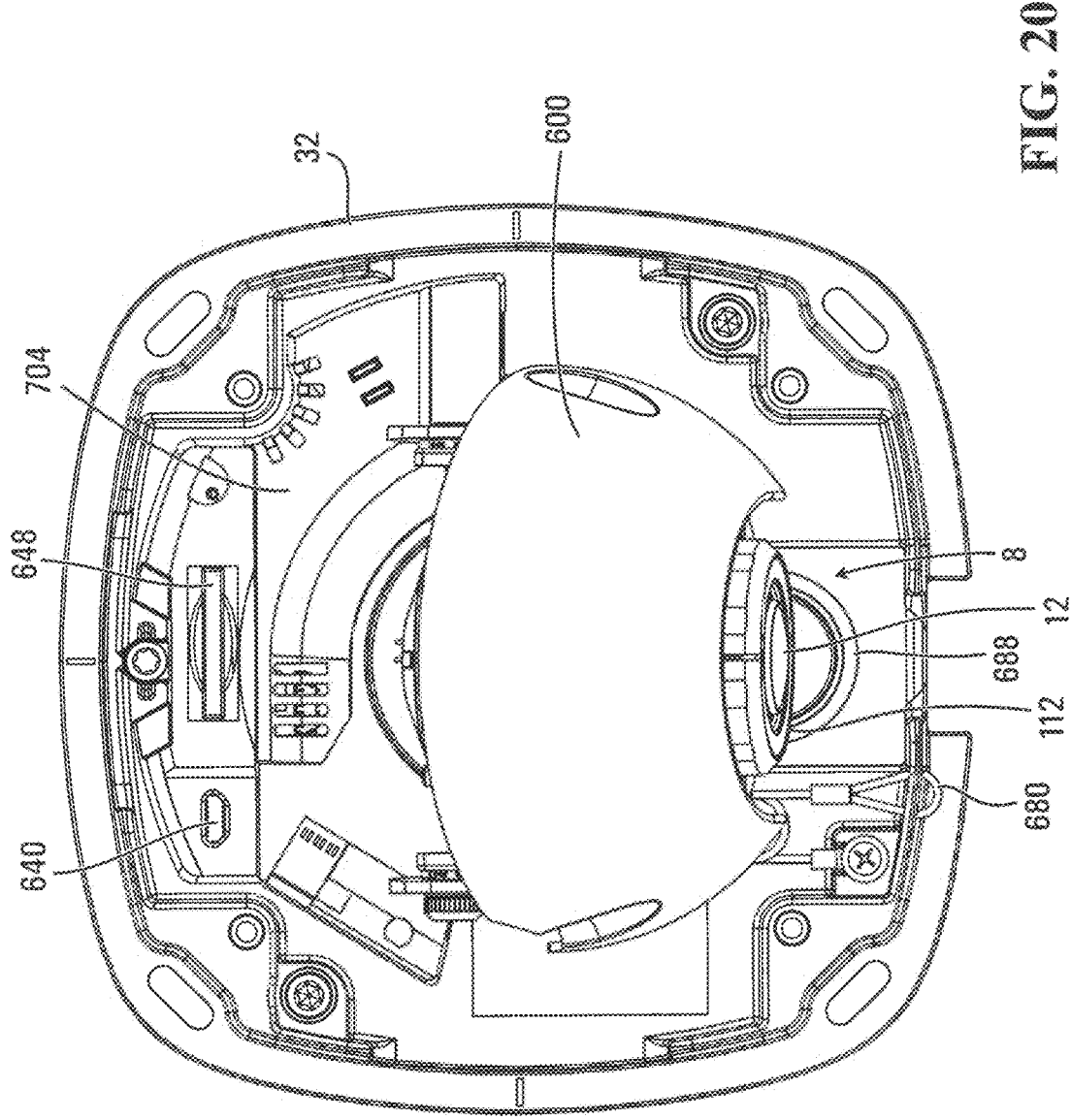
FIG. 20 illustrates a plan view of an operational unit according to one example embodiment having a shroud member positioned in an installation position.

Referring now to FIGS. 18 and 20, therein illustrated are a perspective view and plan view, respectively, of an operational unit 1 having a shroud member 600 in an installation position. In the installation position, the shroud member 600 is displaced to an angular position about its pivot axis 604 so that a portion of the horizontal cross-sectional area 704 that was previously occupied by the shroud member 600 in the concealing position is now freed up. Accordingly, elements located within the camera chamber 216 below the shroud member 600 in the downward direction can now be accessed through the space freed up by the shroud member 600 in the installation position.

According to one example embodiment, the shroud member 600 is pivoted from its concealing position towards a front end 112 of the imaging unit 8 to reach its installation position. For example, an apex 712 of the dome-shaped body 608 of the shroud member 600 is pivoted towards the plane 336 in the angular direction generally indicated by arrow 730 (FIG. 16). Accordingly, when the shroud member 600 is in the installation position, the apex 712 of the shroud member 600 may be substantially aligned with a front end of the imaging unit 8 in its minimum tilt angle of rotation about its second axis 648, as best illustrated in FIG. 18. In the installation position, the bottom lip 632 of the dome-shaped body 608 may be substantially perpendicular to the horizontal plane 336 defined by the bottom lip 340 of the dome bubble member 208. Furthermore, so as to free up the space 704 in the horizontal cross-sectional of the camera device 4, the shroud member 600 in its installation position generally occupies the same area within the horizontal cross-section as the area occupied by the imaging unit 8. Accordingly, the freed-up space 704 providing access to elements located below the shroud member 600 generally corresponds to an area rearward of the imaging unit 8.

Elements located about the first axis 332 below the shroud member 600 may be accessed through the freed-up space 704 by rotating the moving part of the operational unit 1 about the first axis 332. It will be appreciated that rotating the moving part about the first axis 332 changes the angular position of both the imaging unit 8 and the shroud member 600, thereby also changing the location of the freed-up space 704 about the first axis 332.

According to various example embodiments, the shroud member 600 is pivotally coupled to at least one upstanding bracket arm 380 of the support member 364 of the movable part. As described elsewhere herein, the imaging unit 8 may be supported at a first location of the bracket arm 380 to define the second axis 348. Accordingly, the shroud member 600 is pivotally supported at a second location 720 of the bracket arm 380 to define the third axis 604. The first coupling location of the imaging unit 8 to the upstanding bracket arm 380 may be different from the second coupling location of the shroud member 600 to the upstanding bracket arm 380.

According to one example embodiment, the shroud member 600 includes a latch member 728 arranged on an inner surface of the shroud member 600. The latch member 728 is adapted to cooperatively engage a locking slot 736 of the upstanding arm 380. The latch member 728 may be disengaged from the locking slot 736 by pinching the shroud member 600 radially inwardly.

The shroud member 600 may further include a stop member that is adapted to contact a cooperating stop member 752 of the upstanding bracket arm 380 when the shroud member 600 reaches its installation position. The cooperating stop members delimit the pivoting of the shroud member 600 from its concealing position in the direction 730 so that the shroud member 600 does not pivot past its installation position.

According to an example embodiment for installing the camera device having a pivotal shroud member 600, the dome bubble member 208 is initially decoupled from the base member 32 so as to provide access to elements housed within the camera chamber 216. The shroud member 600 is further pivoted to its installation position to free up the space 704 within the horizontal cross section access. The movable part of the operational unit 1 is selectively rotated to one or more angular positions about the first axis 332. The one or more angular positions correspond to positions wherein the freed up space 704 form a channel to access elements located below the shroud member 600. For each of the angular positions of the movable part about the first axis 332, connections may be made to connection ports located below the shroud member 600. Subsequent to making the connections, the movable part is rotated about the first axis 332 to orient the imaging unit 8 and cutaway portion 616 of the shroud member 600 in a desired pan position. The desired pan position corresponds to the pan orientation of the imaging unit 8 according to the installation of the camera device 4 for capturing the scene of interest. The imaging unit 8 is appropriately secured to maintain the pan orientation. The shroud member 600 is pivoted to its concealing position. The imaging unit 8 is rotated about its second axis 348 to a desired tilt position and appropriately secured to maintain this tilt position. The dome bubble member 208 is further secured to the base member 32. It will be understood that the steps described above for installing the camera device 4 are not required to be carried out in the order presented above and that in various example embodiments the order of some steps may be varied.

It will be appreciated that the mounting of the imaging unit 8 and the pivotal shroud member 600 to the movable part of the operational unit according to various example embodiments ensures proper alignment of the imaging unit 8 with the cutaway portion 616 of the shroud member 600. This further ensures that the shroud member 600 will not be misaligned so as to potentially occlude the field of vision of the imaging unit 8. Accordingly, the mounting together of the imaging unit 8 and the pivotal shroud member 600 may facilitate the installation of the camera device 4 in various situations.

Certain adaptations and modifications of the described embodiments can be made. Therefore, the above discussed embodiments are considered to be illustrative and not restrictive, and the invention should be construed as limited only by the appended claims.

The invention claimed is:

1. A camera device comprising:
   a dome bubble member;
   one or more connection ports;
   a base member being cooperatively coupled to the dome bubble member to define a camera chamber; and
   a movable part being housed within the camera chamber and being rotatable relative to the base member about a first axis, the movable part having an imaging unit being rotatable about a second axis and a shroud member being pivotal about a third axis,
   wherein the shroud member is displaceable from an installation position assumed during camera device installation to a concealing position assumed following camera device installation, and wherein when the shroud member is in the concealing position the one or more connection ports are obstructed from access and the imaging unit is housed within the camera chamber.

2. The camera device of claim 1, further comprising a stationary part housed within the camera chamber, the stationary part housing the one or more connection ports;
   wherein the movable part is rotatably coupled to the stationary part to define the first axis;
   wherein the shroud member is positioned above the stationary part relative to the base member;
   wherein in the concealing position, the shroud member substantially obstructs access to the connection ports of the stationary part in a downward direction towards the base member; and
   wherein in the installation position, the shroud member permits access to the connection ports of the stationary part in a downward direction towards the base member via a channel rearward of the imaging unit.

3. A camera device comprising:
   a dome bubble member;
   one or more connection ports;
   a base member being cooperatively coupled to the dome bubble member to define a camera chamber; and
   a movable part being housed within the camera chamber and being rotatable relative to the base member about a first axis, the movable part having an imaging unit being rotatable about a second axis and a concealing shroud member being pivotal about a third axis,
   wherein the concealing shroud member is configured to obstruct the one or more connection ports in a concealing position following camera device installation, and
   wherein the imaging unit comprises:
      a substantially cylindrical body defining an internal chamber, at least a portion of an annular sidewall of the cylindrical body being formed by a thermally conductive material;
      an image sensor being housed within the internal chamber; and
      a thermally conductive spreader member housed within the internal chamber, a first portion of the spreader member being in thermal contact with the image sensor and a second portion of the spreader member being in thermal contact with the thermally conductive portion of the annular sidewall of the cylindrical body.

4. The camera device of claim 3, wherein heat from the image sensor is transmitted to the thermally conductive portion of the annular sidewall of the cylindrical body via the thermally conductive spreader member.

5. The camera device of claim 3, wherein heat received at the thermally conductive portion of the annular sidewall from the image sensor is dissipated from an outer surface of the portion of the annular sidewall to an environment surrounding the annular sidewall.

6. The camera device of claim 3, wherein the thermally conductive spreader member has a substantially planar body and a plurality of arms extending axially from the planar body;
   wherein the image sensor is in contact with the planar body; and
   wherein the arms are in contact with the thermally conductive portion of the annular sidewall.

\* \* \* \* \*